(12) United States Patent
Lee et al.

(10) Patent No.: US 11,284,261 B2
(45) Date of Patent: Mar. 22, 2022

(54) SYSTEM INFORMATION SECURITY CONTAINER

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/855,773

(22) Filed: Apr. 22, 2020

(65) Prior Publication Data

US 2020/0344611 A1    Oct. 29, 2020

Related U.S. Application Data

(60) Provisional application No. 62/838,513, filed on Apr. 25, 2019.

(51) Int. Cl.
*H04W 12/10* (2021.01)
*H04W 12/30* (2021.01)
(Continued)

(52) U.S. Cl.
CPC ......... *H04W 12/10* (2013.01); *H04W 12/041* (2021.01); *H04W 12/30* (2021.01); *H04W 12/69* (2021.01)

(58) Field of Classification Search
CPC ... H04W 12/10; H04W 12/30; H04W 12/041; H04W 12/69
See application file for complete search history.

(56) References Cited

U.S. PATENT DOCUMENTS 10,243,652 B2 * 3/2019 Heath ................. H04L 41/0645
10,663,556 B2 * 5/2020 Lindoff .................. H04L 63/08
(Continued)

FOREIGN PATENT DOCUMENTS

WO    WO-2018059676 A1    4/2018

OTHER PUBLICATIONS

3rd Generation Partnership Project; Technical Specification Group Services and System Aspects; Study on the Security Aspects of the Next Generation System (Release 14), 3GPP Standard; S3-172095, Technical Report; 3GPP TR 33.899, 3rd Generation Partnership Project (3GPP), Mobile Competence Centre; 650, Route Des Lucioles; F-06921 Sophia-Antipolis Cedex; France, vol. SA WG3, No. v1.3.0, Aug. 21, 2017, 605 pages, XP051336126,Retrieved from the Internet: URL: http://www.3gpp.org/ftp/tsg_sa/WG3_Security/TSGS3_88_Dali/Docs/ [retrieved on Aug. 21, 2017] the whole document.
(Continued)

*Primary Examiner* — Viral S Lakhia
(74) *Attorney, Agent, or Firm* — Qualcomm Incorporated

(57) ABSTRACT

Methods, systems, and devices for wireless communication are described. Generally, the described techniques provide for efficiently protecting communications between a base station and a UE with limited signaling and processing overhead. As described herein, a base station may generate a system information security container (SISC) including integrity information of one or more system information blocks (SIBs), and the base station may transmit (e.g., broadcast) the SISC with a signature to one or more UEs (e.g., to protect the integrity information of the SIBs in the SISC). Once a UE receives the SISC, the UE may verify the signature of the SISC, identify the system information included in the SISC (e.g., the system information included in the integrity information of the SIBs), and apply the
(Continued)

system information for communications with the base station.

24 Claims, 17 Drawing Sheets

(51) Int. Cl.
  *H04W 12/041* (2021.01)
  *H04W 12/69* (2021.01)

(56) References Cited

U.S. PATENT DOCUMENTS

| | | | |
|---|---|---|---|
| 10,681,536 B1* | 6/2020 | Ye | H04W 8/183 |
| 10,757,572 B2* | 8/2020 | Lee | H04W 12/0431 |
| 10,833,874 B2* | 11/2020 | Ying | H04L 9/3263 |
| 10,863,427 B2* | 12/2020 | Wang | H04W 24/02 |
| 2018/0059676 A1* | 3/2018 | Smith | G05D 1/0259 |
| 2019/0174449 A1* | 6/2019 | Shan | H04W 76/11 |
| 2019/0271757 A1* | 9/2019 | Lindoff | G01S 5/0242 |
| 2020/0084698 A1* | 3/2020 | Rune | H04W 48/08 |
| 2020/0374693 A1* | 11/2020 | Strom | G06F 21/57 |

OTHER PUBLICATIONS

International Search Report and Written Opinion—PCT/US2020/029478—ISA/EPO—dated Jul. 31, 2020.

\* cited by examiner

SYSTEM INFORMATION SECURITY CONTAINER

CROSS REFERENCE

The present application for patent claims the benefit of U.S. Provisional Patent Application No. 62/838,513 by LEE et al., entitled "SYSTEM INFORMATION SECURITY CONTAINER," filed Apr. 25, 2019, assigned to the assignee hereof, and expressly incorporated by reference herein.

BACKGROUND

The following relates generally to wireless communications and more specifically to a system information security container (SISC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, communications between a base station and a UE may be protected to prevent hacks and data breaches. Protected communications may include communications that contain private or confidential information. In some cases, however, some types of network communications may lack protection or security. Since unprotected communications in a wireless network may be subject to exploitation by attackers which may be detrimental to a wireless network, techniques for protecting security sensitive communications in a wireless network may be desirable.

SUMMARY

The described techniques relate to improved methods, systems, devices, and apparatuses that support a system information security container (SISC). Generally, the described techniques provide for efficiently protecting communications between a base station and a user equipment (UE) with limited signaling and processing overhead. As described herein, a base station may generate a SISC including integrity information of one or more system information blocks (SIBs), and the base station may transmit (e.g., broadcast) the SISC with a signature to one or more UEs (e.g., to protect the integrity information of the SIBs in the SISC). The signature included with the SISC may be generated using a private parameter (e.g., private key or certificate) such that a UE may be able to determine that the SISC is from a legitimate base station (e.g., rather than a false base station).

Once a UE receives the SISC, the UE may verify the signature of the SISC and identify the system information included in the SISC (e.g., the system information included in the integrity information of the SIBs). The UE may then apply the system information for communications with the base station (e.g., to access the base station in an initial access procedure). Because the SISC may be transmitted with a signature, the system information included in the SISC may be protected. Further, because the SISC may include integrity information of multiple SIBs, the signaling and processing overhead associated with protecting the SIBs may be minimized (e.g., compared to a security scheme where each SIB is protected individually).

A method for wireless communication at a UE is described. The method may include receiving an indication of a system parameter to be used by the UE to verify system information transmissions from a base station, receiving a SISC including integrity information of one or more SIBs from the base station, determining a cell identity of the base station, verifying a signature of the SISC based on the cell identity and the system parameter, identifying system information included in the integrity information of the one or more SIBs based on the verifying, and applying the system information included in the integrity information of the one or more system information blocks to communications with the base station.

An apparatus for wireless communication at a UE is described. The apparatus may include a processor, memory in electronic communication with the processor, and instructions stored in the memory. The instructions may be executable by the processor to cause the apparatus to receive an indication of a system parameter to be used by the UE to verify system information transmissions from a base station, receive a SISC including integrity information of one or more SIBs from the base station, determine a cell identity of the base station, verify a signature of the SISC based on the cell identity and the system parameter, identify system information included in the integrity information of the one or more SIBs based on the verifying, and apply the system information included in the integrity information of the one or more SIBs to communications with the base station.

Another apparatus for wireless communication at a UE is described. The apparatus may include means for receiving an indication of a system parameter to be used by the UE to verify system information transmissions from a base station, receiving a SISC including integrity information of one or more SIBs from the base station, determining a cell identity of the base station, verifying a signature of the SISC based on the cell identity and the system parameter, identifying system information included in the integrity information of the one or more SIBs based on the verifying, and applying the system information included in the integrity information of the one or more SIBs to communications with the base station.

A non-transitory computer-readable medium storing code for wireless communication at a UE is described. The code may include instructions executable by a processor to receive an indication of a system parameter to be used by the UE to verify system information transmissions from a base station, receive a SISC including integrity information of one or more SIBs from the base station, determine a cell identity of the base station, verify a signature of the SISC based on the cell identity and the system parameter, identify system information included in the integrity information of the one or more SIBs based on the verifying, and apply the system information included in the integrity information of the one or more SIBs to communications with the base station.

A method for wireless communication at a base station is described. The method may include identifying one or more SIBs to broadcast to one or more UEs, generating a SISC including integrity information of the one or more SIBs, performing a signing procedure to include a signature with the SISC, the signature indicating that the SISC is associated with a cell identity of the base station, and broadcasting the SISC including the integrity information of the one or more SIBs with the signature to the one or more UEs.

An apparatus for wireless communication at a base station is described. The apparatus may include a processor, memory in electronic communication with the processor, and instructions stored in the memory. The instructions may be executable by the processor to cause the apparatus to identify one or more SIBs to broadcast to one or more UEs, generate a SISC including integrity information of the one or more SIBs, perform a signing procedure to include a signature with the SISC, the signature indicating that the SISC is associated with a cell identity of the base station, and broadcast the SISC including the integrity information of the one or more SIBs with the signature to the one or more UEs.

Another apparatus for wireless communication at a base station is described. The apparatus may include means for identifying one or more SIBs to broadcast to one or more UEs, generating a SISC including integrity information of the one or more SIBs, performing a signing procedure to include a signature with the SISC, the signature indicating that the SISC is associated with a cell identity of the base station, and broadcasting the SISC including the integrity information of the one or more SIBs with the signature to the one or more UEs.

A non-transitory computer-readable medium storing code for wireless communication at a base station is described. The code may include instructions executable by a processor to identify one or more SIBs to broadcast to one or more UEs, generate a SISC including integrity information of the one or more SIBs, perform a signing procedure to include a signature with the SISC, the signature indicating that the SISC is associated with a cell identity of the base station, and broadcast the SISC including the integrity information of the one or more SIBs with the signature to the one or more UEs.

DETAILED DESCRIPTION

Figure 1:
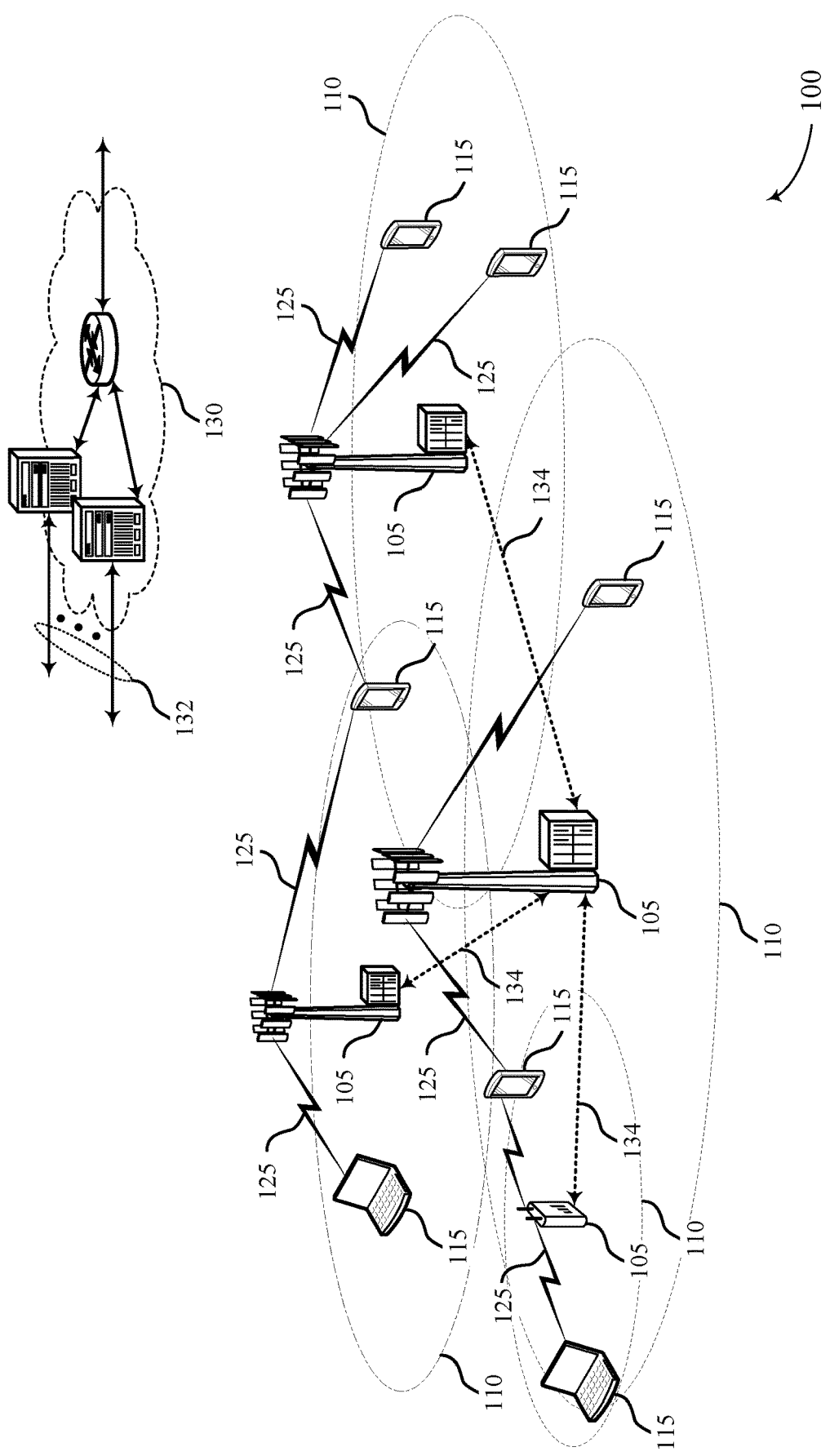
FIG. 1 illustrates an example of a wireless communications system that supports a system information security container (SISC) in accordance with aspects of the present disclosure.

In some wireless communications systems, communications between a base station and a user equipment (UE) may be protected to prevent hacks and data breaches. Protected communications may include communications that contain private or confidential information. In some cases, however, some types of network communications may lack protection or security. In particular, messages transmitted before security algorithms have been agreed upon between a UE and a core network may lack adequate protection. Further, messages used to establish configurations for communications between a UE and a base station (e.g., access stratum (AS) and non-access stratum (NAS) messages) may also lack adequate protection. Since unprotected communications in a wireless network may be subject to exploitation by attackers which may be detrimental to a wireless network, techniques for protecting security sensitive communications in a wireless network may be desirable.

Accordingly, wireless systems may include security procedures to protect communications between a UE and a base station and stop (or attempt to stop) attackers or other third parties from obtaining private information. For instance, a wireless system may support procedures for protecting system information transmissions which may occur before security algorithms have been agreed upon between a UE and a core network and may be used to establish configurations for communications between a UE and a base station. In one example, a wireless system may support certificate-based cryptography, where a base station may sign a system information transmission using a certificate received from a network entity. In another example, a wireless system may support identity-based cryptography, where a base station may sign a system information transmission using a private key received from a network entity (e.g., to generate an identity-based signature (IBS)). In both examples, however, the base station may be configured to sign each system information transmission individually, and there may be several system information blocks (SIBs) that the base station may broadcast periodically. As a result, the signaling overhead associated with broadcasting each of the SIBs with a signature may be high, and the processing overhead associated with verifying each SIB may also be high.

As described herein, a wireless communications system may support efficient techniques for protecting communications between a base station and a UE with limited signaling and processing overhead. In particular, rather than sending each SIB with a signature to protect the SIB from attackers, a base station may generate a system information security container (SISC) that includes integrity information of one or more SIBs, and the base station may transmit (e.g., broadcast) the SISC with a signature to one or more UEs (e.g., to protect the integrity information of the SIBs in the SISC). Once a UE receives the SISC, the UE may verify the signature of the SISC and identify the system information included in the SISC (e.g., the system information included in the integrity information of the SIBs). The UE may then apply the system information for communications with the base station (e.g., to access the base station in an initial access procedure).

In some cases, though the UE may verify the signature of the entire SISC, the UE may selectively verify the SIBs that the UE is interested in or is configured to read in the SISC. Specifically, the SISC may include integrity information for multiple SIBs, but the UE may verify the integrity information for a subset of SIBs that the UE is interested in or is configured to read (or the integrity information generated for a group of SIBs that includes the subset of SIBs that the UE is interested in or is configured to read). As an example, a UE may be configured to read SIB X, and the SISC may contain integrity information for SIB X and SIB Y. Thus, the UE may verify the SISC signature and check the integrity information of SIB X (e.g., since the UE may not be interested in or be configured to read SIB Y). Because the SISC may be transmitted with a signature, the system information included in the SISC may be protected. Further, because the SISC may include integrity information of multiple SIBs, the signaling and processing overhead associated with protecting the SIBs may be minimized (e.g., compared to a security scheme where each SIB is protected independently).

Aspects of the disclosure introduced above are described below in the context of a wireless communications system. Examples of processes and signaling exchanges that support a SISC are then described. Aspects of the disclosure are further illustrated by and described with reference to apparatus diagrams, system diagrams, and flowcharts that relate to a SISC.

FIG. 1 illustrates an example of a wireless communications system 100 that supports a SISC in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In wireless communications system 100, communications between a base station 105 and a UE 115 may be protected to prevent hacks and data breaches. Protected communications may include communications that contain private or confidential information. In some cases, however, some types of communications in a wireless system may lack protection or security. In particular, messages transmitted before security algorithms have been agreed upon between a UE 115 and a core network 130 may lack adequate protection. Further, messages used to establish configurations for communications between a UE 115 and a base station 105 (e.g., AS and NAS messages) may also lack adequate protection.

As a result, false base stations may be able to communicate with a UE 115, and the UE 115 may not be able to determine that the false base station is not a legitimate base station 105 in a wireless network. In such cases, the contents of messages sent by the UE 115 to the base station 105 may be read by outside parties and attackers (e.g., the creators of the false base stations), and these outside parties or attackers may discover private information about the UE 115 or its user. Further, because the UE 115 may be camped on a false base station rather than a legitimate base station 105 (e.g., in an idle state), the UE 115 may not have access to certain services or may be denied access to certain services by the false base station (e.g., public safety warnings, incoming emergency calls, real-time application server push services, proximity services, etc.).

Figure 2:
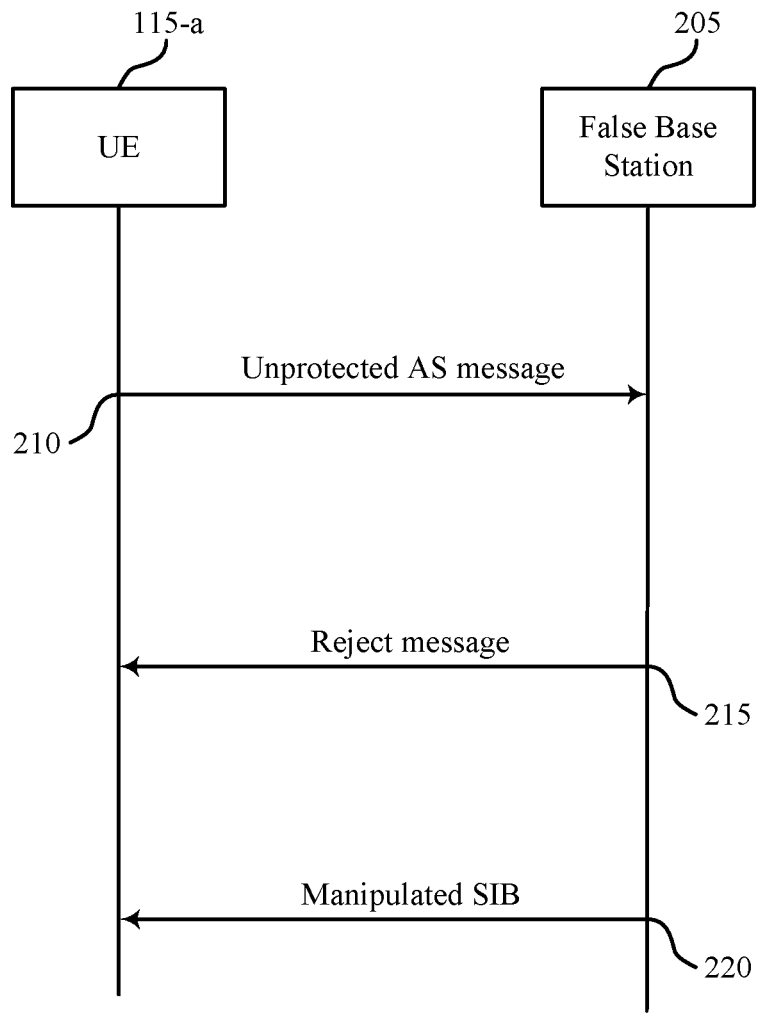
FIGS. 2 and 3 illustrate examples of process flows.

FIG. 2 illustrates an example of a process flow 200 that illustrates issues that may occur in transmitting messages prior to a security context being established between a UE 115 and a legitimate base station 105. FIG. 2 depicts a UE 115-a and a false base station 205, which may be examples of the corresponding devices described with reference to FIG. 1, engaging in wireless communications. Unprotected AS messages may be intercepted and exploited by attackers such as false base station 205. For instance, at 210, UE 115-*a* may transmit an unprotected AS message to false base station 205, and false base station 205 may receive the unprotected AS message and extract private information about UE 115-*a* from the unprotected AS message, such as the UE's capabilities and its identifier (e.g., International Mobile Subscriber Identity).

In another instance, false base station 205 may launch a denial of service (DoS) attack on UE 115-*a*. For example, false base station 205 may receive a tracking area update (TAU) request message in the AS message transmitted by UE 115-*a* at 210. In a normal TAU request, UE 115-*a* may inform the UE's serving network about the UE's present location in order to facilitate network services to the UE 115-*a*. However, in this scenario, at 215, false base station 205 may transmit a reject message to reject the TAU request from UE 115-*a*, which may cause UE 115-*a* to consider a universal subscriber identity module (USIM) as invalid for evolved packet system (EPS) services and non-EPS services until UE 115-*a* switches off or the universal integrated circuit card (UICC) containing the USIM is removed.

Additionally, false base station 205 may deny certain services (such as fifth generation (5G), fourth generation (4G), and third generation (3G) services) to a 5G device, thereby effectively downgrading available service options to second generation (2G) services. Once downgraded, UE 115-*a* may be open to legacy 2G vulnerabilities. False base station 205 may also deny mission critical services such as public safety warnings, incoming emergency calls, real-time application server push services, proximity services, etc. Further, in some examples, at 220, false base station 205 may broadcast a manipulated (or false) SIB. In such examples, UE 115-*a* may encounter denied or degraded services via the manipulated SIB because the manipulated SIB may possess parameters different from those included in a legitimate SIB. These services may include, cell access, cell re-selection, earthquake and tsunami warnings, etc.

Figure 3:
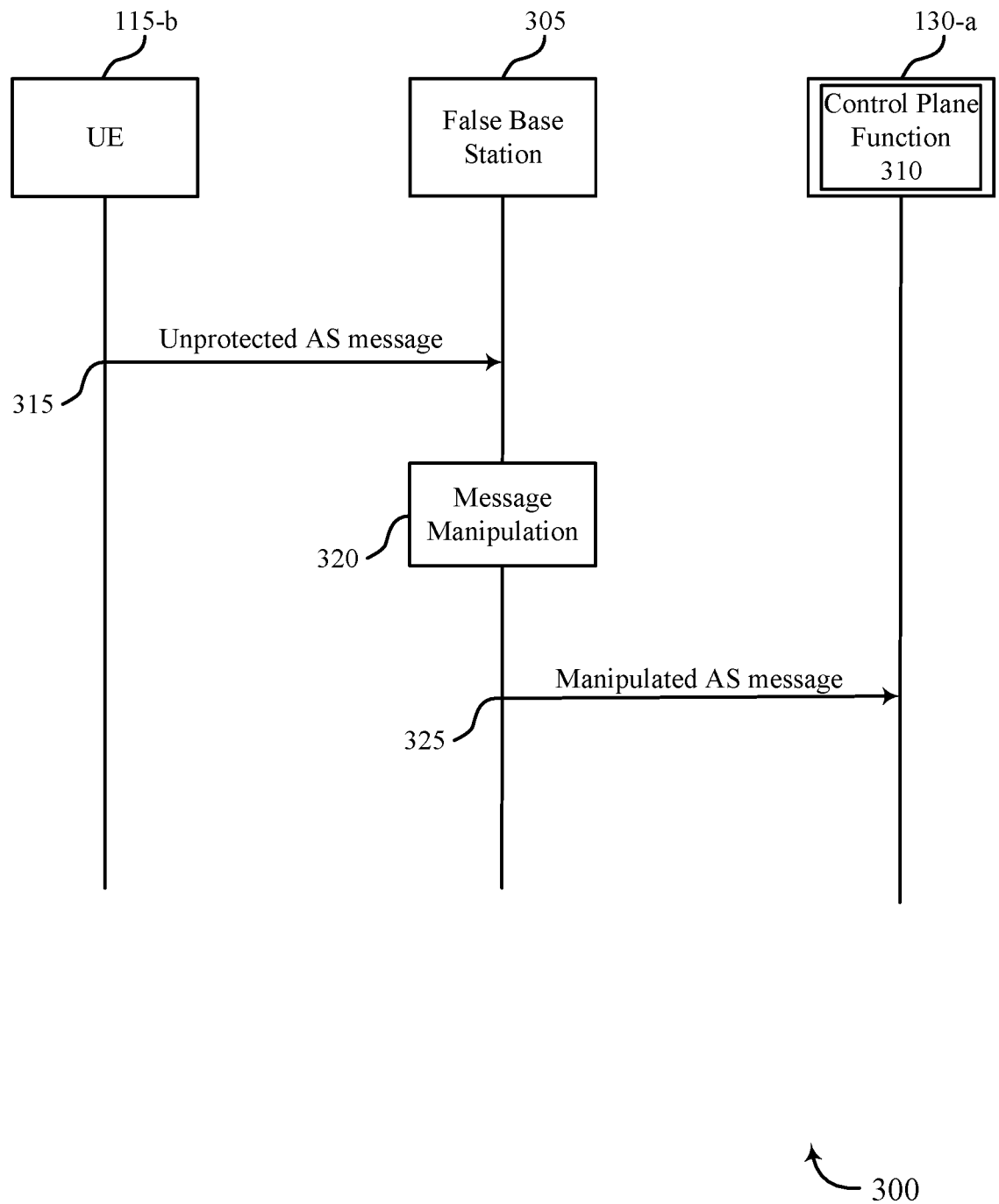

FIG. 3 illustrates an example of a process flow 300 that illustrates further issues that may occur in transmitting messages prior to a security context being established between a UE 115 and a legitimate base station 105. For instance, process flow 300 may illustrate an example of a "bidding-down attack." FIG. 3 depicts a UE 115-*b*, false base station 305, and a core network 130-*a*, which may be examples of the corresponding devices or entities described with reference to FIG. 1, engaging in wireless communications. As illustrated in FIG. 3, the core network 130-*a* may include multiple components, including a control plane function 310 which may participate in AS communication. At 315, UE 115-*b* may initiate an attach request message in the form of an unprotected AS message transmitted to false base station 305. The unprotected AS message may contain voice domain preference information and the UE's usage setting that informs the false base station 305 of the UE's voice calling capability.

At 320, false base station 305 may manipulate the unprotected AS message and remove these capabilities from the unprotected AS message. The false base station 305 may then change an information element such as "Additional Update Type" to "short message service (SMS) only," for example. At 325, false base station 305 may then forward the manipulated AS message to the UE's serving network, core network 130-*a*. Core network 130-*a* may accept the manipulated AS message and perform an authorization procedure with UE 115-*b* using this message to complete an attach procedure. Thus, under this scenario, core network 130-*a* may configure the profile of UE 115-*b* such that it enables only SMS and data services. UE 115-*b* would then be unable to send or receive voice calls. In some examples, wireless devices other than false base station 305 may be utilized for bidding-down attacks.

Thus, as described with reference to FIGS. 2 and 3, before an authentication and key agreement or some other security procedure is performed between a UE 115 and a base station 105, network communications may lack protection or security. Additionally, when a UE 115 has performed authentication and established NAS security with a base station 105 in a previous session, a UE 115 may transition to an idle state. When transitioning from the idle state to a connected state, communications between a UE 115 and a base station 105 may be compromised. As a result, outside parties or attackers may discover private information about the UE 115 or its user or may even exploit the intercepted information and disable or degrade certain services to the UE 115.

Accordingly, wireless communications system 100 may include security procedures to stop (or attempt to stop) attackers or other third parties from obtaining private information. In particular, wireless communications system 100 may support procedures for protecting system information transmissions which may occur before security algorithms have been agreed upon between a UE 115 and a core network 130, where the system information may be used to establish configurations for communications between a UE 115 and a base station 105. In one example, wireless communications system 100 may support certificate-based cryptography, where a base station 105 may sign a system information transmission using a certificate received from a network entity. In another example, wireless communications system 100 may support identity-based cryptography, where a base station 105 may sign a system information transmission using a private key received from a network entity (e.g., to generate an identity-based signature (IBS)).

However, in both examples described above related to certificate-based cryptography or identity-based cryptography, the base station 105 may be configured to sign each system information transmission independently, and there may be several system information blocks (SIBs) that the base station 105 may broadcast periodically. As a result, the signaling overhead associated with broadcasting the SIBs with a signature (e.g., broadcasting protected SIBs) may be high, and the processing overhead associated with verifying each SIB at the UE 115 may also be high. As described herein, wireless communications system 100 may support efficient techniques for protecting communications between a base station 105 and a UE 115 with limited signaling and processing overhead.

It is to be understood that the techniques described herein are not only related to protecting system information transmissions while limiting signaling and processing overhead. For instance, aspects of the techniques described herein may be related to protecting other communications that occur before AS security activation from an RRC control plane signaling (unicast messages) perspective (e.g., communications in an RRC connection setup procedure, a UE identity acquisition procedure, a UE capability information transfer, and a downlink or uplink information transfer procedure, etc.). It may be appropriate to protect these unicast messages as well, given that most of the reported hackings on LTE networks have been on the unprotected initial messages like attach reject messages (e.g., evolved packet system (EPS) mobility management (EMM) error codes), TAU reject messages, etc. which are transmitted over the air interface before AS security activation.

Figure 4:
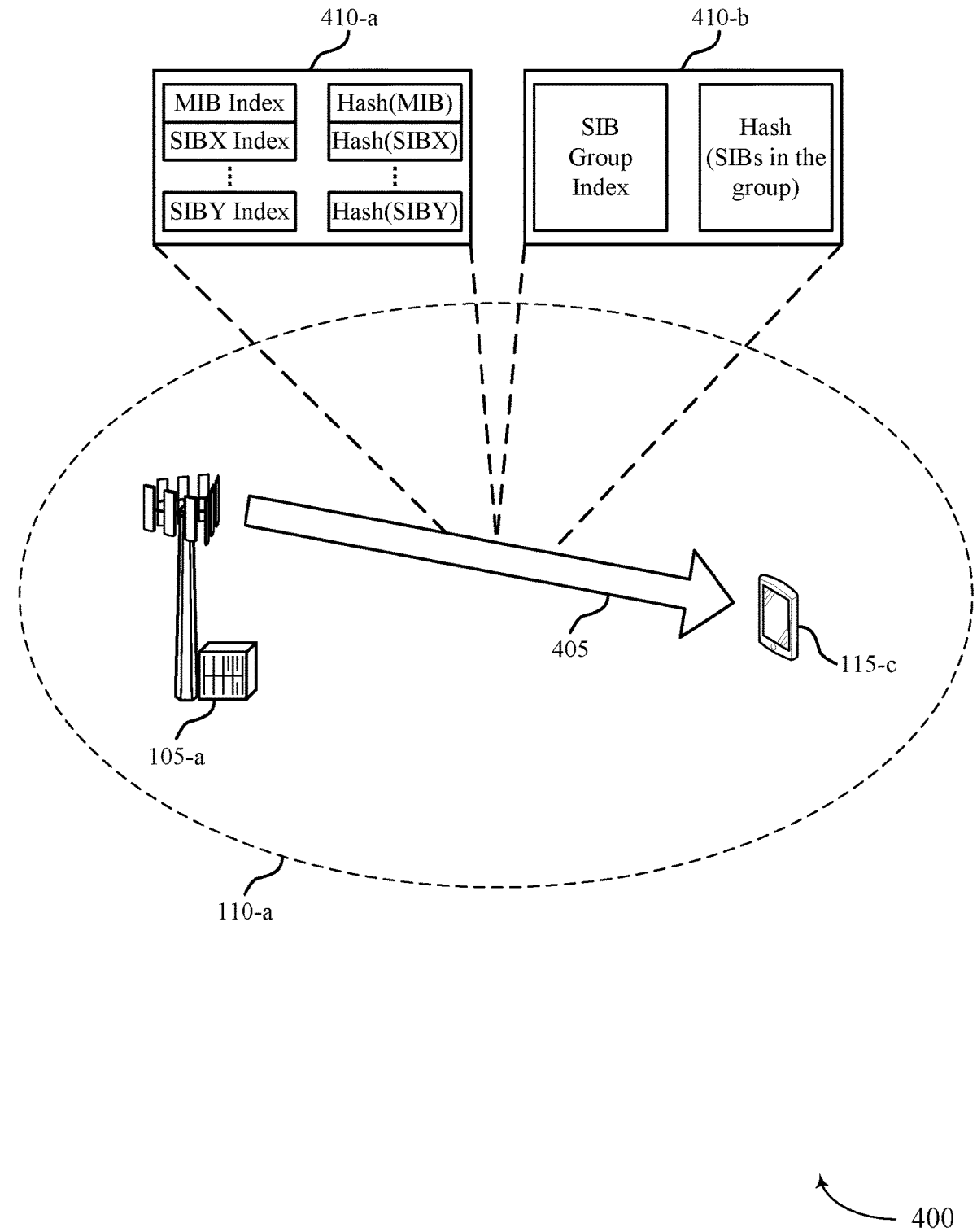
FIG. 4 illustrates an example of a wireless communications system that supports a SISC in accordance with aspects of the present disclosure.

FIG. 4 illustrates an example of a wireless communications system 400 that supports a SISC in accordance with aspects of the present disclosure. Wireless communications system 400 includes base station 105-a, which may be an example of a base station 105 (e.g., a legitimate base station) described with reference to FIGS. 1-3. Wireless communications system 400 also includes UE 115-c, which may be an example of a UE 115 described with reference to FIGS. 1-3. Base station 105-a may provide communication coverage for a geographic coverage area 110-a, which may be an example of a geographic coverage area 110 described with reference to FIG. 1. Wireless communications system 400 may implement aspects of wireless communications system 100. For example, wireless communications system 400 may support efficient techniques for protecting communications between base station 105-a and a UE 115-c with limited signaling and processing overhead. As described herein, a master information block (MIB) may be a form of system information (e.g., utilized in LTE systems) and may, in some cases, be described as one type of SIB.

In the example of FIG. 4, base station 105-a may identify one or more SIBs to transmit to UE 115-c. Using the techniques described herein, to limit the signaling overhead and processing overhead associated with protecting the SIBS, the base station 105-a may wrap the SIBs in a SISC 410, where the SISC 410 may be protected. Specifically, the base station 105-a may identify integrity information associated with one or more SIBS, and the base station 105-a may transmit (e.g., or broadcast) the SISC 410 including the integrity information associated with the one or more SIBs with a signature (e.g., a signature specific to the identity of base station 105-a or the identity of a cell at base station 105-a). Once UE 115-c receives the SISC, UE 115-c may verify the signature of the SISC, decode the integrity information of the one or more SIBs in the SISC to identify the system information (e.g., the system information included in the one or more SIBs), and apply the system information for communications with base station 105-a. In some cases, after verifying the signature of the SISC, the UE 115-c may decode the integrity information of SIBs in the SISC corresponding to SIBs that the UE 115-c is interested in or wants to read (e.g., the UE 115-c may not decode the integrity information of SIBs in the SISC that the UE 115-c is not interested in or does not want to read).

In some aspects, the integrity information of the one or more SIBs may be hashes of each of the one or more SIBS, and the hashes of each of the one or more SIBs may be transmitted in a SISC 410-a. In such aspects, the SISC 410-a may also include indices of the one or more hashed SIBs included in the SISC 410-a. For instance, the SISC 410-a may include a MIB index, a SIBX index (e.g., where SIBX corresponds to any of SIB1, SIB2, etc.), a SIBY index (e.g., where SIBY corresponds to any of SIB1, SIB2, etc. and is different from SIBX), and other SIB indices, and the SISC 410-a may also include a hash of the MIB, a hash of SIBX, a hash of SIBY, and a hash of each of the other Ms. Accordingly, when UE 115-c receives the SISC 410-a, the UE 115-c may first identify the hashed SIBs included in the SISC 410-a (e.g., based on the indicated SIB indices), and the UE 115-c may decode the hashed SIBs included in the SISC 410-a to identify the system information included in the hashed SIBs. The UE 115-c may then apply the system information for communications with base station 105-a.

In other aspects (not shown), the integrity information of the one or more SIBs may be a hash of a group of SIBs (e.g., or multiple hashes of multiple groups of SIBs), and the hash of the group of SIBs may be transmitted in a SISC 410-b. In such aspects, the SISC 410-b may also include a group index that identifies the one or more SIBs in the hashed group of SIBs. For instance, the SISC 410-b may include a group index corresponding to SIB1, SIB2, and SIB3, and the SISC 410-b may also include a hash of SIB1, SIB2, and SIB3 (e.g., a single hash for a group of SIBs). Accordingly, when UE 115-c receives the SISC 410-b, the UE 115-c may first identify the hashed group of SIBs included in the SISC 410-b (e.g., based on the indicated group SIB index), and the UE 115-c may decode the hashed group of SIBs included in the SISC 410-b to identify the system information included in the hashed group of SIBs. As mentioned above, although FIG. 4 illustrates a single SIB group index and a single hashed group of SIBs, it is to be understood that the SISC 410-b may include multiple SIB group indices and multiple hashed groups of SIBs (e.g., hash of group 1, hash of group 2, etc.). The UE 115-c may then apply the system information for communications with base station 105-a. In some examples, the definition of groups of SIBs may be system specific. Further, highly dynamic SIBs (e.g., SIBs that may be change frequently, such as SIBs including coordinated universal time (UTC) or user account control (UAC) information, may not be included in a hash calculation. For example, only security sensitive SIBs may be protected or hashed and included in a SISC 410.

In some cases, base station 105-a may transmit an SISC 410 including integrity information of one or more SIBs in an existing SIB transmission (e.g., an already established SIB transmission in wireless communications system 400). For example, base station 105-a may transmit the SISC 410 in a SIB1 transmission (e.g., since UE 115-c may always read the SIB1 when it connects to the base station 105-a). In other cases, base station 105-a may transmit an SISC 410 including integrity information of one or more SIBs in a separate, security SIB transmission (e.g., a security SIB different from SIBs already established in wireless communications system 400). Further, in some implementations, to prevent or minimize replay attacks from false base stations, a randomness or freshness parameter may be incorporated in the generation of the signature of the SISC. In such implementations, the randomness or freshness parameter may be determined based on a system frame number (SFN), hyper SFN (HSFN), UTC value, or a combination thereof. Different techniques for generating the signature of the SISC are described below with reference to FIGS. 5-7. However, the techniques described herein related to protecting a SISC that includes integrity information of one or more SIBs may not be limited to the following techniques for generating the signature (e.g., may also include protection based on UE measurement reports).

Figure 5:
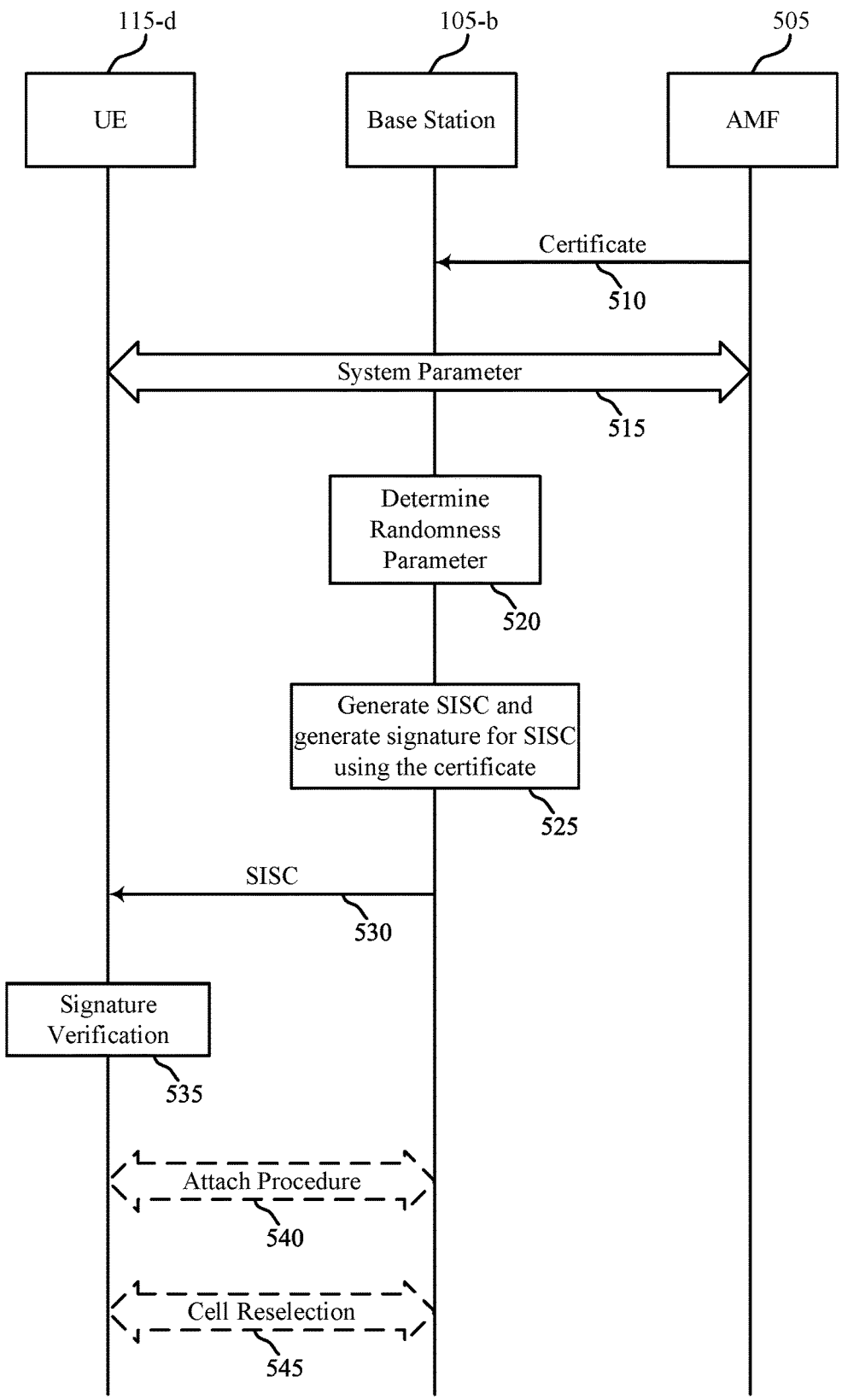
FIGS. 5-7 illustrate examples of process flows that support a SISC in accordance with aspects of the present disclosure.

FIG. 5 illustrates an example of certificate-based encryption of a SISC at a base station in a process flow 500 in accordance with aspects of the present disclosure. Process flow 500 illustrates aspects of techniques performed by a UE 115-d, which may be an example of a UE 115 described with reference to FIGS. 1-4. Process flow 500 also illustrates aspects of techniques performed by a base station 105-b, which may be an example of a base station 105 described with reference to FIGS. 1-4. Further, process flow 500 illustrates aspects of techniques performed by an access and mobility management function (AMF) 505, which may be an example of a network entity described herein.

At 510, AMF 505 may provision base station 105-b with a certificate which may be used to encrypt private information or messages transmitted by base station 105-b. The certificate may be generated by AMF 505 based on an identify of base station 105-b or the identity of a cell at base station 105-b. At 515, AMF 505 may provision UE 115-d with a system parameter (e.g., a signed public key), which may be used by UE 115-d to verify the certificate of base station 105-b. In some cases, UE 115-d may obtain or receive an indication of SIB protection (e.g., that transmitted SIBs may be protected) and the system parameter during a registration procedure. For instance, UE 115-d may receive a registration accept message (e.g., an integrity protected message) that may include the indication of SIB protection and the system parameter of the AMF.

At 520, base station 105-b may then determine a randomness parameter to use to generate a signature for a SISC, and, at 525, base station 105-b may generate the SISC and use the certificate and the randomness parameter to generate the signature to include with the SISC. At 530, base station 105-b may transmit the SISC to UE 115-d (e.g., in SIB1 or a security SIB). As described with reference to FIG. 4, the SISC may refer to a message containing integrity information associated with one or more SIBs, an indication of the one or more SIBs (e.g., the SIB indices), and a signature (e.g., a signature specific to the identity of base station 105-b or the identity of a cell at base station 105-b).

In some cases, base station 105-b may also transmit (or broadcast) its certificate as part of the SIB or as a separate SIB. As such, when UE 115-d receives an indication that there is SIB protection, the UE 115-d shall verify the integrity information (e.g., hash of SIBS) included in the SISC and the signature of the SISC when camping on a cell (e.g., a cell at base station 105-b). That is, at 535, UE 115-d may read a SIB (e.g., SIB1 or a security SIB) to identify the SISC, determine a cell identity of base station 105-b (e.g., based on decoding the hashed system information included in the SISC), verify the certificate of the base station 105-b using the system parameter of the AMF and the cell identity, and verify the SISC using the certificate of the base station 105-b.

Upon successful verification of the signature, UE 115-d may decode the integrity information of the one or more SIBs in the SISC to identify the system information (e.g., the system information included in the one or more SIBs), and apply the system information for communications with base station 105-b. For instance, at 540, UE 115-d may utilize the system information contained within the SISC (e.g., in hashed SIBs within the SISC) to initiate an attach procedure with base station 105-b. Alternatively, if UE 115-d fails to verify the signature of the SISC (e.g., due to a randomness parameter associated with UE 115-d not matching the randomness parameter associated with base station 105-b), UE 115-d may determine that the randomness parameter has potentially been replayed and may perform a cell reselection procedure at 545.

Figure 6:
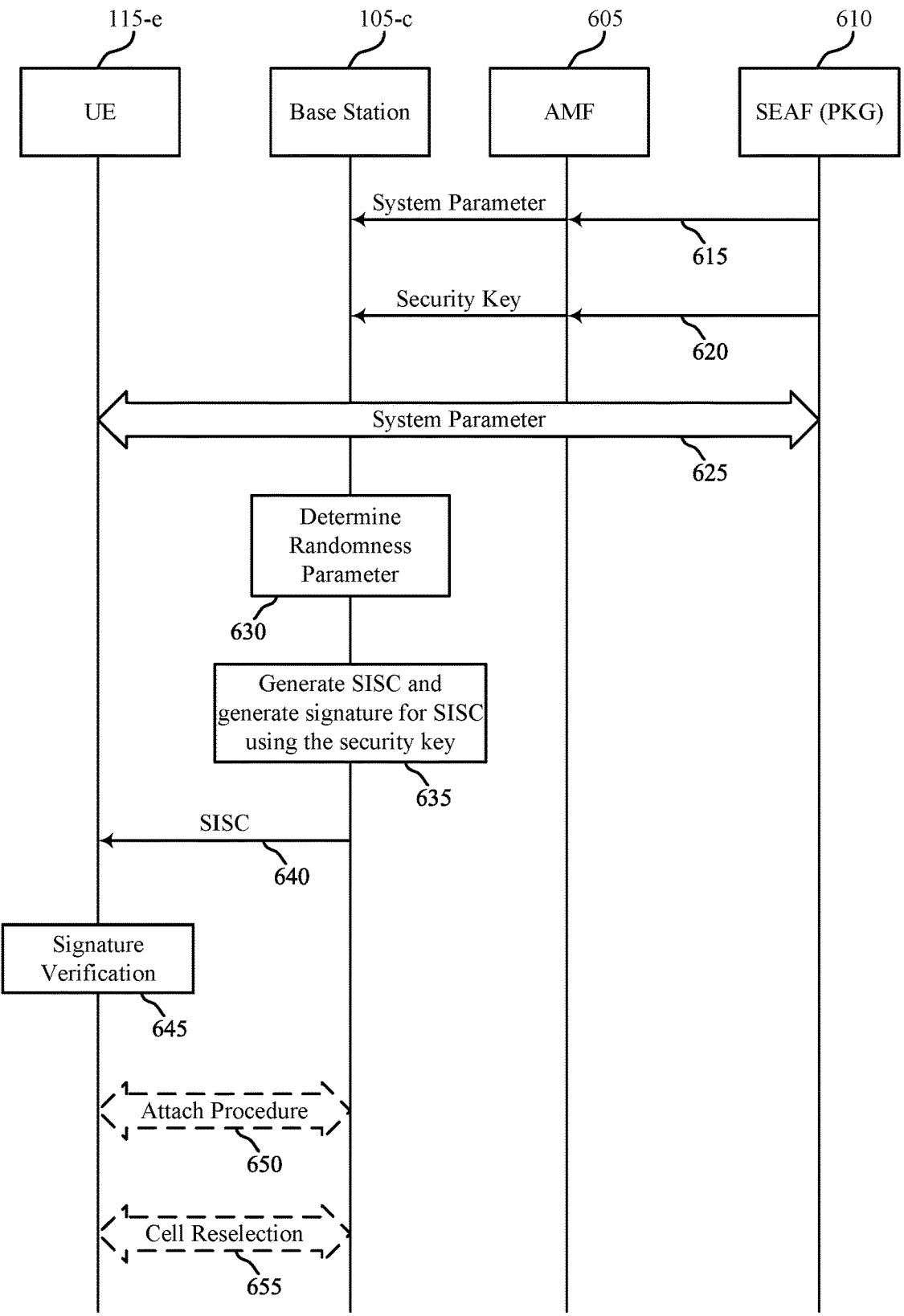

FIG. 6 illustrates an example of identity-based encryption of a SISC at a base station in a process flow 600 in accordance with aspects of the present disclosure. Process flow 600 illustrates aspects of techniques performed by a UE 115-e, which may be an example of a UE 115 described with reference to FIGS. 1-4. Process flow 600 also illustrates aspects of techniques performed by a base station 105-c, which may be an example of a base station 105 described with reference to FIGS. 1-4. Further, process flow 600 illustrates aspects of techniques performed by an AMF 605 and a security anchor function (SEAF) (or public key generator (PKG)) 610, which may be examples of network entities described herein.

In the example of FIG. 6, a network entity such as SEAF or PKG 610 (e.g., a PKG collocated with a SEAF) may identify one or more system parameters (public parameters) for use by UE 115-e and base station 105-c. The one or more system parameters may be indexed, and, at 615, SEAF 610 may pass the one or more system parameters to AMF 605, which may then provision base station 105-c with the one or more system parameters. Similarly, at 620, PKG 610 may identify and transmit a private security key to AMF 605, which may then provision base station 105-c with the private security key. In some examples, the private security key is based at least in part on a cell identity of a cell associated with UE 115-e and base station 105-c. Further, at 625, AMF 605 may also pass the one or more system parameters received from SEAF 610 to UE 115-e. In some cases, UE 115-e may obtain or receive an indication of SIB protection (e.g., that transmitted SIBs may be protected) and the one or more system parameters during a registration procedure. For instance, UE 115-e may receive a registration accept message (e.g., an integrity protected message) that may include the indication of SIB protection and the one or more system parameters of the AMF.

At 630, base station 105-c may then determine a randomness parameter to use to generate a signature for a SISC, and, at 635, base station 105-c may generate the SISC and use the private security key and the randomness parameter (e.g., in addition to the one or more system parameters) to generate the signature to include with the SISC. That is, base station 105-c may determine the signature to include with the SISC based on the one or more system parameters, the private security key, and the randomness parameter. At 640, base station 105-c may transmit the SISC to UE 115-e (e.g., in SIB1 or a security SIB). As described with reference to FIG. 4, the SISC may refer to a message containing integrity information associated with one or more SIBs, an indication of the one or more SIBs (e.g., the SIB indices), and a signature (e.g., a signature specific to the identity of base station 105-c or the identity of a cell at base station 105-c).

As such, when UE 115-e receives an indication that there is SIB protection, the UE 115-e shall verify the integrity information (e.g., hash of SIBs) included in the SISC and the signature of the SISC when camping on a cell (e.g., a cell at base station 105-c). That is, at 645, UE 115-e may read a SIB (e.g., SIB1 or a security SIB) to identify the SISC, determine a cell identity of base station 105-c (e.g., based on decoding the hashed system information included in the SISC), and verify the SISC using the system parameter (e.g., public key) of the AMF (e.g., received at 625) and the cell identity.

Upon successful verification of the signature, UE 115-e may decode the integrity information of the one or more SIBs in the SISC to identify the system information (e.g., the system information included in the one or more SIBs), and apply the system information for communications with base station 105-c. For instance, at 650, UE 115-e may utilize the system information contained within the SISC (e.g., in hashed SIBs within the SISC) to initiate an attach procedure with base station 105-c. Alternatively, if UE 115-e fails to verify the signature of the SISC (e.g., due to a randomness parameter associated with UE 115-e not matching the randomness parameter associated with base station 105-c), UE 115-e may determine that the randomness parameter has potentially been replayed and may perform a cell reselection procedure at 655.

Figure 7:
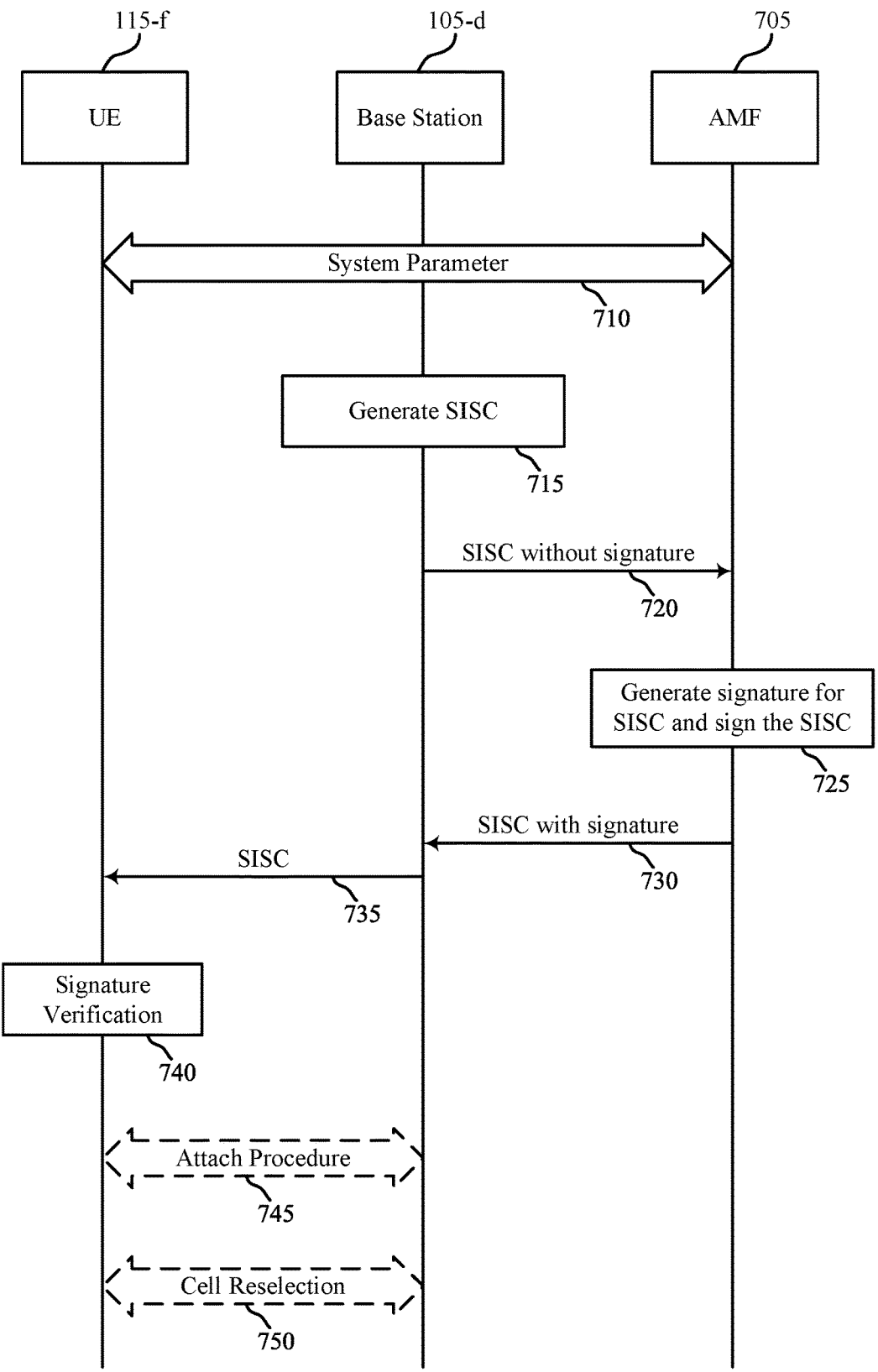

FIG. 7 illustrates an example of identity-based encryption of a SISC at an AMF in a process flow 700 in accordance with aspects of the present disclosure. Process flow 700 illustrates aspects of techniques performed by a UE 115-f, which may be an example of a UE 115 described with reference to FIGS. 1-4. Process flow 700 also illustrates aspects of techniques performed by a base station 105-*d*, which may be an example of a base station 105 described with reference to FIGS. 1-4. Further, process flow 700 illustrates aspects of techniques performed by an AMF 705, which may be an example of a network entity described herein.

At 710, AMF 705 may provision UE 115-*f* with a system parameter which may be used to verify protected transmissions from base station 105-*d*. In some cases, UE 115-*f* may obtain or receive an indication of SIB protection (e.g., that transmitted SIBs may be protected) and the system parameter during a registration procedure. For instance, UE 115-*f* may receive a registration accept message (e.g., an integrity protected message) that may include the indication of SIB protection and the system parameter of the AMF. At 715, base station 105-*d* may then generate a SISC for transmission to UE 115-*f* (e.g., when new system information is created and is ready to be signed). As described with reference to FIG. 4, the SISC may refer to a message containing integrity information associated with one or more SIBs, an indication of the one or more SIBs (e.g., the SIB indices), and a signature (e.g., a signature specific to the identity of base station 105-*d* or the identity of a cell at base station 105-*d*).

At 720, base station 105-*d* may then transmit the SISC without a signature to AMF 705 for signing (e.g., as a request for a signature). At 725, AMF 705 may generate the signature for the SISC and sign the SISC (e.g., include the signature with the SISC). In some cases, AMF 705 may generate or compute the signature for the SISC based on a determined randomness parameter (e.g., the AMF 705 may add the randomness parameter), a private key of the AMF, and a cell identity of base station 105-*d* or a cell at base station 105-*d*. In some cases, AMFs in a same AMF set, registration area, or tracking area may be configured to use the same signing key. Because the base station 105-*d* may send the SISC to the AMF 705 for signing or request that the AMF signs the SISC, AMF 705 may not have to issue a separate certificate to base station 105-*d* (e.g., and other base stations 105), which may limit the overhead associated with certificate management (e.g., since the AMF 705 may not have to signal certificates to base stations 105). Further, because the content of SIBs may not change frequently, the communications involved in signaling SISCs for a signature at AMF 705 may not be substantial (e.g., the signature may not have to change if the content of the SIBs do not change).

At 730, AMF 705 may then transmit the SISC with the signature to base station 105-*d*, and base station 105-*d* may transmit the SISC with the signature to UE 115-*f* (e.g., in a SIB1 or a security SIB). As described with reference to FIG. 4, the SISC may refer to a message containing integrity information associated with one or more SIBs, an indication of the one or more SIBs (e.g., the SIB indices), and a signature (e.g., a signature specific to the identity of base station 105-*d* or the identity of a cell at base station 105-*d*). As such, when UE 115-*f* receives an indication that there is SIB protection, the UE 115-*f* shall verify the integrity information (e.g., hash of SIBs) included in the SISC and the signature of the SISC when camping on a cell (e.g., a cell at base station 105-*d*). That is, at 740, UE 115-*f* may read a SIB (e.g., SIB1 or a security SIB) to identify the SISC, determine a cell identity of base station 105-*d* (e.g., based on decoding the hashed system information included in the SISC), and verify the SISC using the system parameter (e.g., public key) of the AMF (e.g., received at 710) and the cell identity.

Upon successful verification of the signature, UE 115-*f* may decode the integrity information of the one or more SIBs in the SISC to identify the system information (e.g., the system information included in the one or more SIBs), and apply the system information for communications with base station 105-*d*. For instance, at 745, UE 115-*f* may utilize the system information contained within the SISC (e.g., in hashed SIBs within the SISC) to initiate an attach procedure with base station 105-*d*. Alternatively, if UE 115-*f* fails to verify the signature of the SISC (e.g., due to a randomness parameter associated with UE 115-*f* not matching the randomness parameter associated with base station 105-*d*), UE 115-*f* may determine that the randomness parameter has potentially been replayed and may perform a cell reselection procedure at 750.

Figure 8:
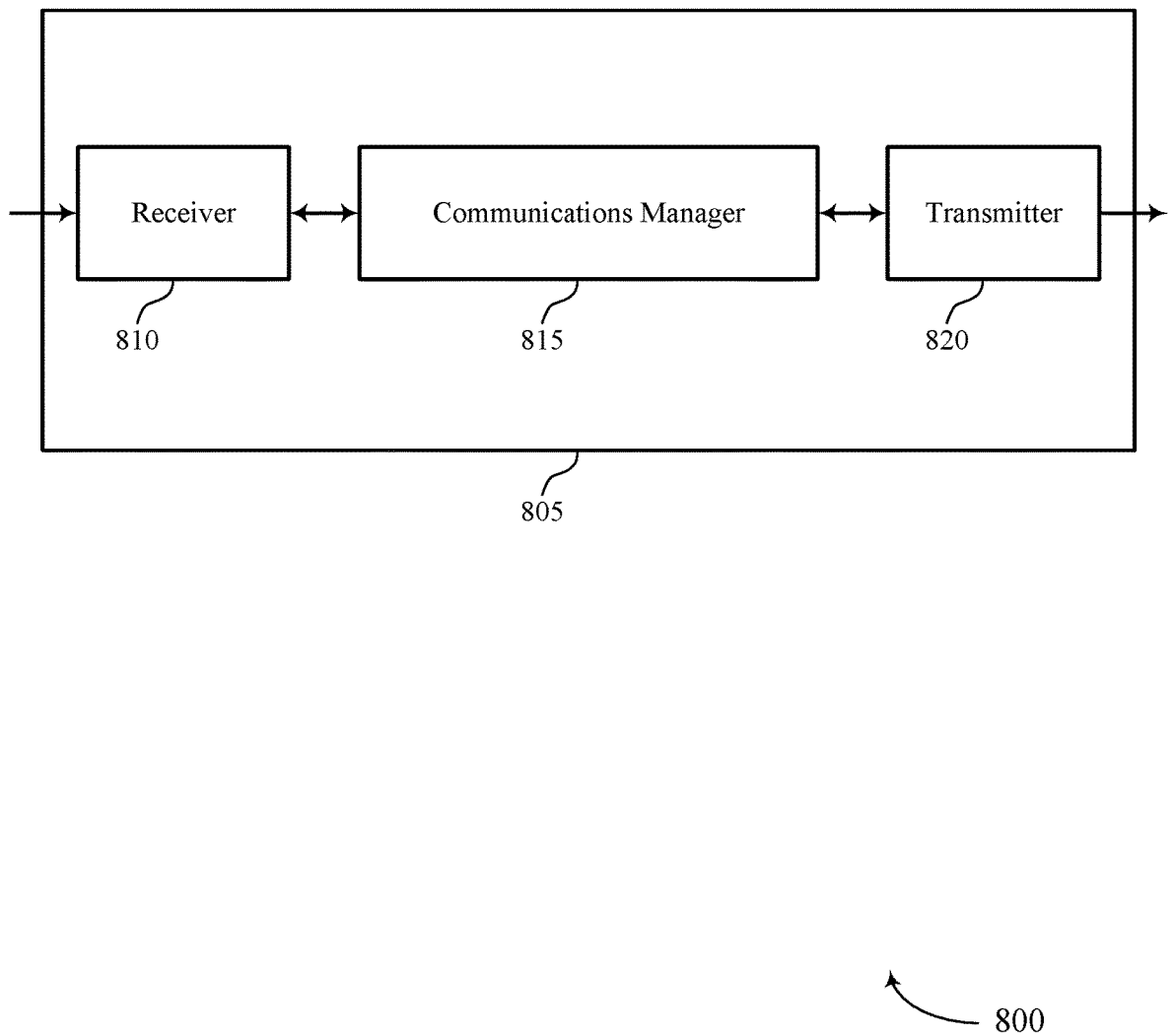
FIGS. 8 and 9 show block diagrams of devices that support a SISC in accordance with aspects of the present disclosure.

FIG. 8 shows a block diagram 800 of a device 805 that supports a SISC in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to a SISC, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an indication of a system parameter to be used by the UE to verify system information transmissions from a base station, receive a SISC including integrity information of one or more SIBs from the base station, determine a cell identity of the base station, verify a signature of the SISC based on the cell identity and the system parameter, identify system information included in the integrity information of the one or more SIBs based on the verifying, and apply the system information included in the integrity information of the one or more SIBs to communications with the base station. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
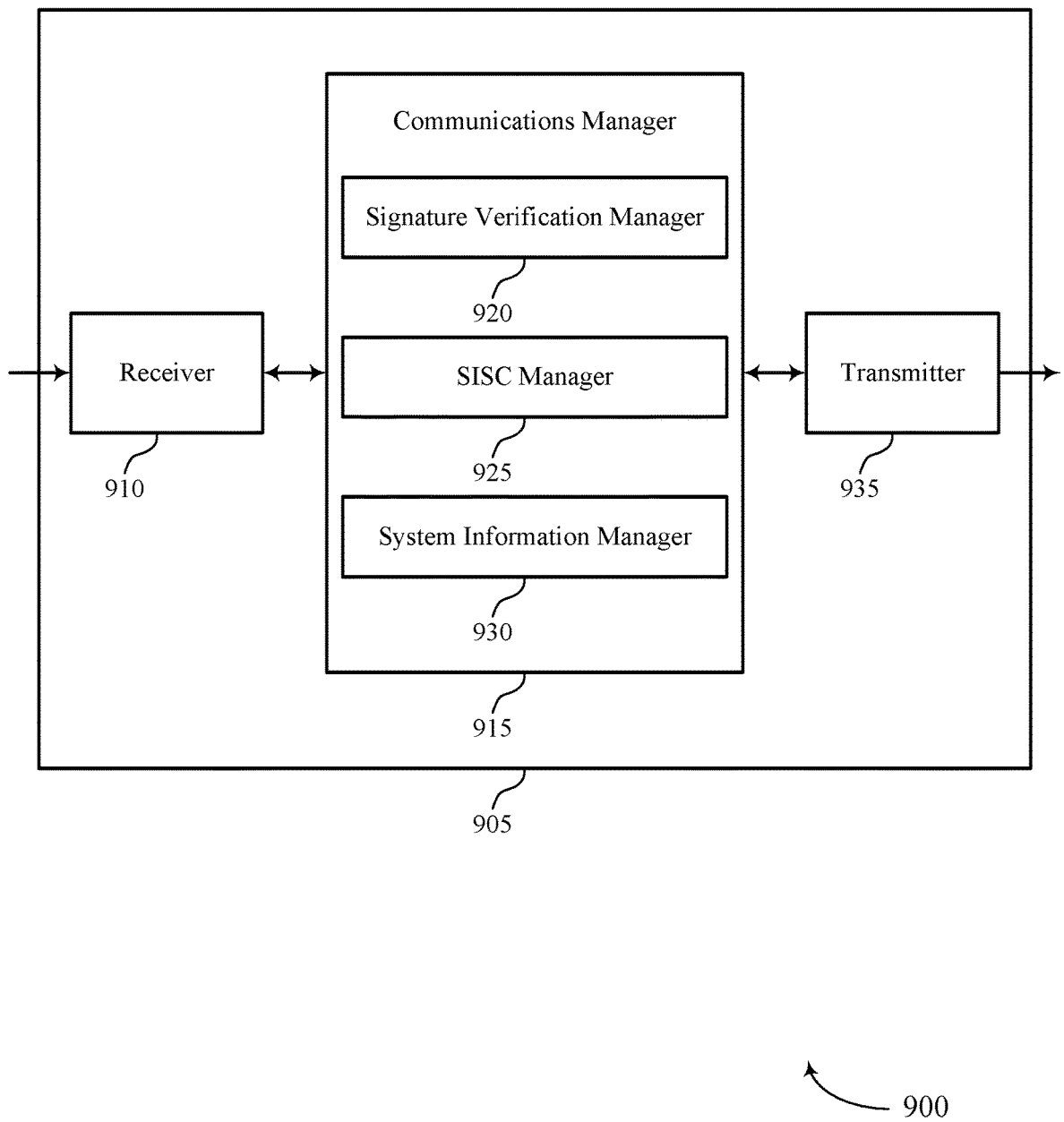

FIG. 9 shows a block diagram 900 of a device 905 that supports a SISC in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to a SISC, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a signature verification manager 920, a SISC manager 925, and a system information manager 930. The communications manager 915 may be an example of aspects of the communications manager 1110 described herein.

The signature verification manager 920 may receive an indication of a system parameter to be used by the UE to verify system information transmissions from a base station. The SISC manager 925 may receive a SISC including integrity information of one or more SIBs from the base station. The signature verification manager 920 may determine a cell identity of the base station, and verify a signature of the SISC based on the cell identity and the system parameter. The system information manager 930 may identify system information included in the integrity information of the one or more SIBs based on the verifying and apply the system information included in the integrity information of the one or more SIBs to communications with the base station.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
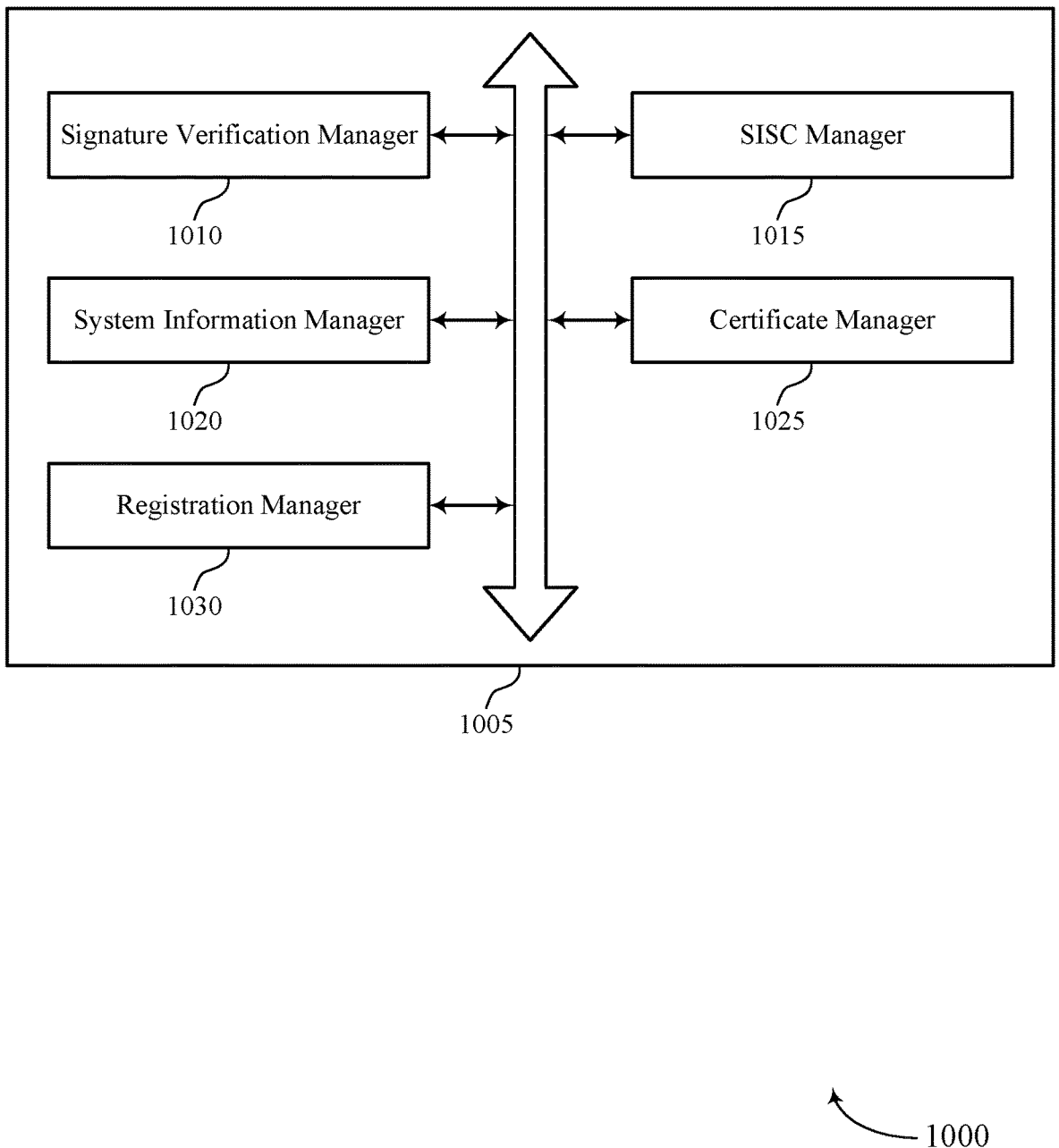
FIG. 10 shows a block diagram of a communications manager that supports a SISC in accordance with aspects of the present disclosure.

FIG. 10 shows a block diagram 1000 of a communications manager 1005 that supports a SISC in accordance with aspects of the present disclosure. The communications manager 1005 may be an example of aspects of a communications manager 815, a communications manager 915, or a communications manager 1110 described herein. The communications manager 1005 may include a signature verification manager 1010, a SISC manager 1015, a system information manager 1020, a certificate manager 1025, and a registration manager 1030. Each of these modules may communicate, directly or indirectly, with one another (e.g., via one or more buses).

The signature verification manager 1010 may receive an indication of a system parameter to be used by the UE to verify system information transmissions from a base station. The SISC manager 1015 may receive a SISC including integrity information of one or more SIBs from the base station. In some examples, the signature verification manager 1010 may determine a cell identity of the base station. In some examples, the signature verification manager 1010 may verify a signature of the SISC based on the cell identity and the system parameter. The system information manager 1020 may identify system information included in the integrity information of the one or more SIBs based on the verifying. In some examples, the system information manager 1020 may apply the system information included in the integrity information of the one or more SIBs to communications with the base station.

In some examples, the SISC includes a set of indices of the one or more SIBs and corresponding integrity information, where the integrity information is a hash of the one or more SIBs. In some examples, the signature is computed over the set and indicates that the SISC is associated with the cell identity of the base station. In some examples, the SISC manager 1015 may receive the SISC in a SIB1 transmission (e.g., in the place of the SIB1 transmission), the SISC including the SIB1. In some examples, the SISC manager 1015 may receive the SISC in a security SIB transmission. In some examples, the signature verification manager 1010 may determine a randomness parameter used to generate the signature of the SISC, where verifying the signature of the SISC is further based on the randomness parameter. In some examples, the signature verification manager 1010 may determine the randomness parameter based on an SFN, an HSFN, a UTC, or a combination thereof.

In some examples, the signature verification manager 1010 may determine the cell identity of the base station based on the system information included in the integrity information of the one or more SIBs. In some examples, the SISC is signed by the base station using a certificate. In such examples, the certificate manager 1025 may verify the certificate based on the system parameter and the cell identity, where the system parameter includes a public key, and the signature verification manager 1010 may verify the signature of the SISC based on the certificate. In some examples, the SISC is signed by the base station using a private key, and the signature verification manager 1010 may verify the signature of the SISC based on the cell identity and the system parameter, where the system parameter includes a public parameter. In some examples, the SISC is signed by a network entity using a private key, and the signature verification manager 1010 may verify the signature of the SISC based on the cell identity and the system parameter, where the system parameter includes a public key.

The registration manager 1030 may receive the indication of the system parameter in a registration procedure. In some cases, the integrity information of the one or more SIBs includes one or more hashed system information blocks. In some examples, the system information manager 1020 may decode the one or more hashed SIBs to identify the system information. In some cases, the one or more SIBs include security sensitive SIBs.

Figure 11:
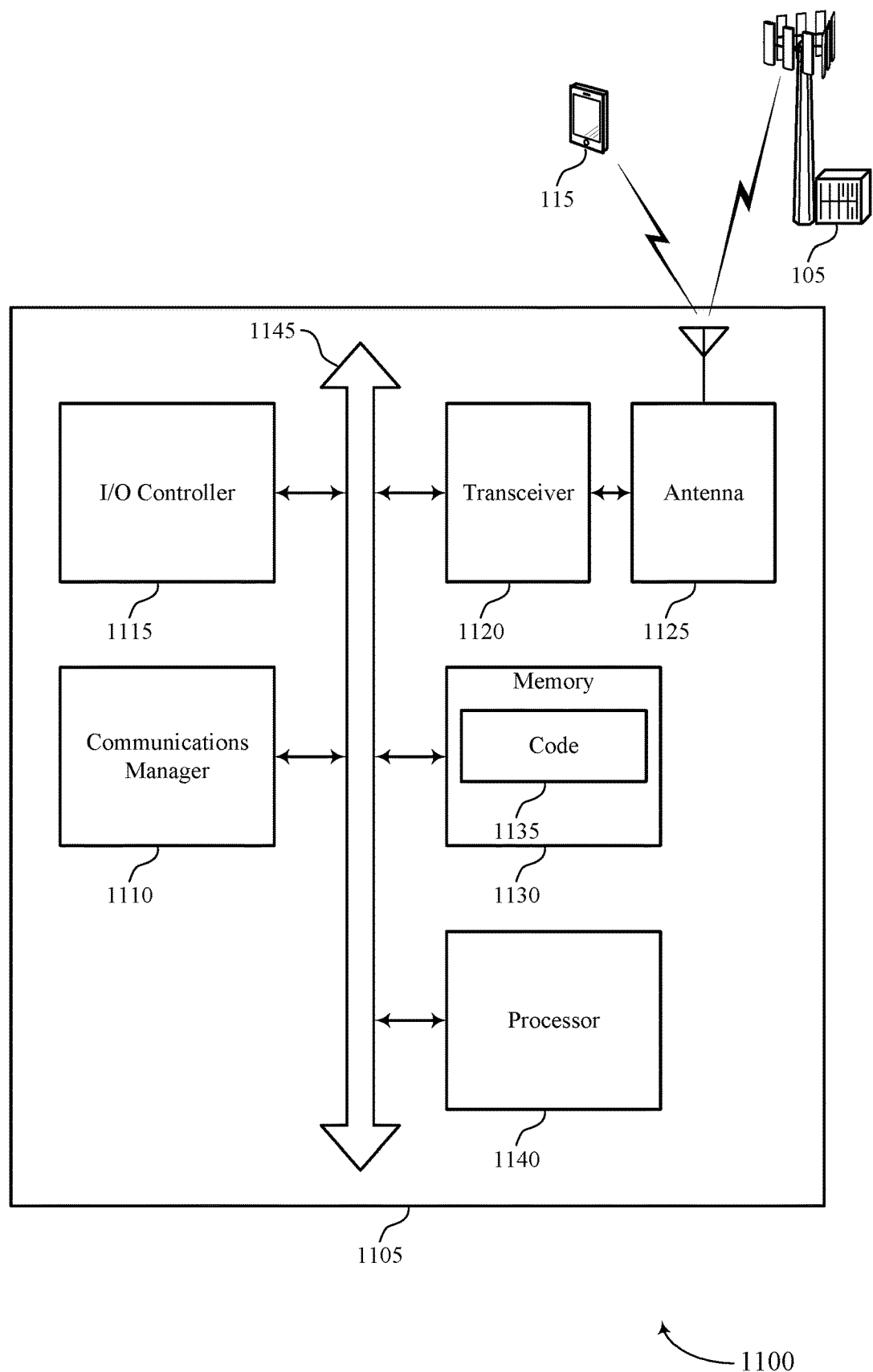
FIG. 11 shows a diagram of a system including a device that supports a SISC in accordance with aspects of the present disclosure.

FIG. 11 shows a diagram of a system 1100 including a device 1105 that supports a SISC in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive an indication of a system parameter to be used by the UE to verify system information transmissions from a base station, receive a SISC including integrity information of one or more SIBs from the base station, determine a cell identity of the base station, verify a signature of the SISC based on the cell identity and the system parameter, identify system information included in the integrity information of the one or more SIBs based on the verifying, and apply the system information included in the integrity information of the one or more SIBs to communications with the base station.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a SISC).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
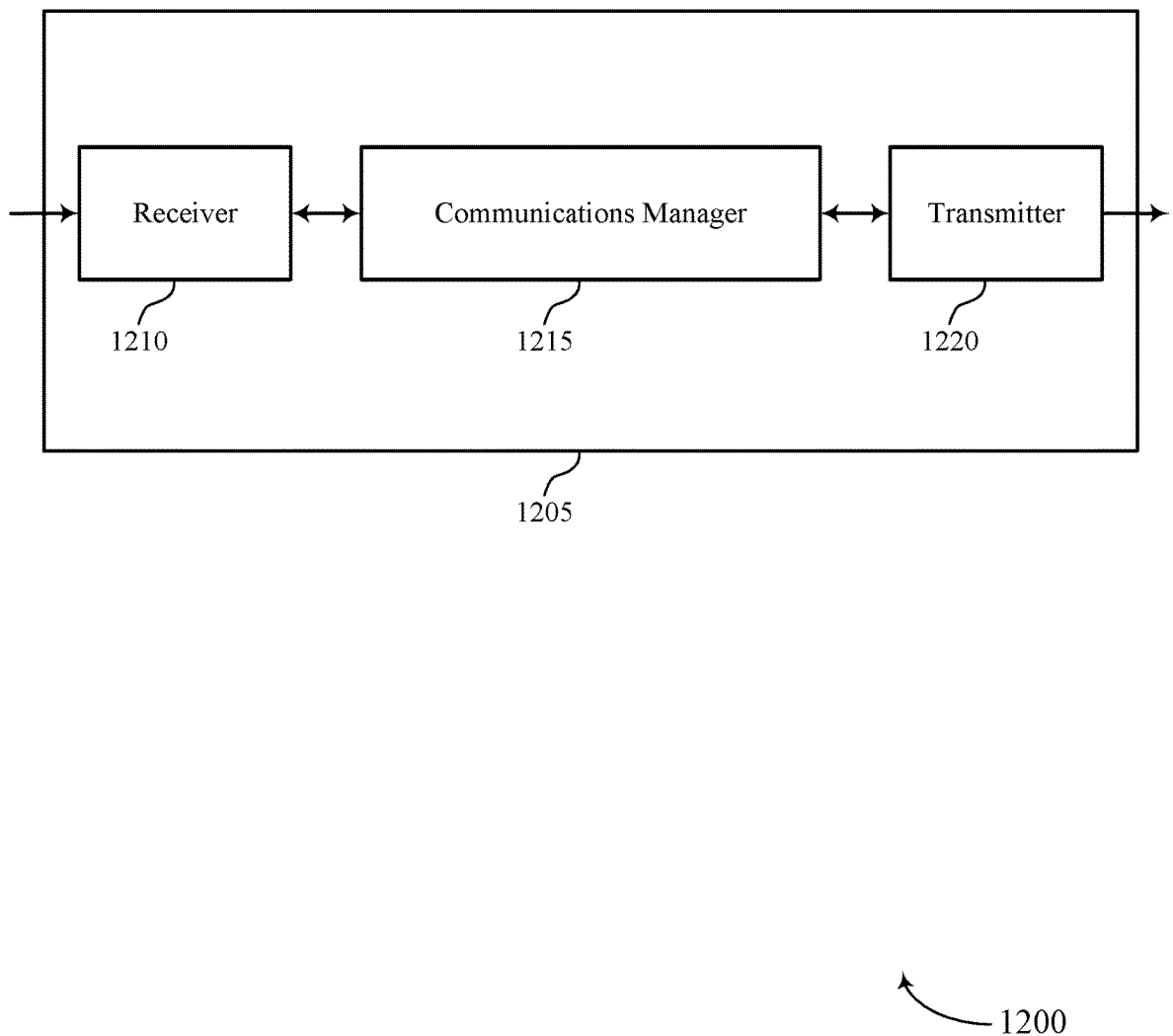
FIGS. 12 and 13 show block diagrams of devices that support a SISC in accordance with aspects of the present disclosure.

FIG. 12 shows a block diagram 1200 of a device 1205 that supports a SISC in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to a SISC, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify one or more SIBs to broadcast to one or more UEs, generate a SISC including integrity information of the one or more SIBs, perform a signing procedure to include a signature with the SISC, the signature indicating that the SISC is associated with a cell identity of the base station, and broadcast the SISC including the integrity information of the one or more SIBs with the signature to the one or more UEs, and. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
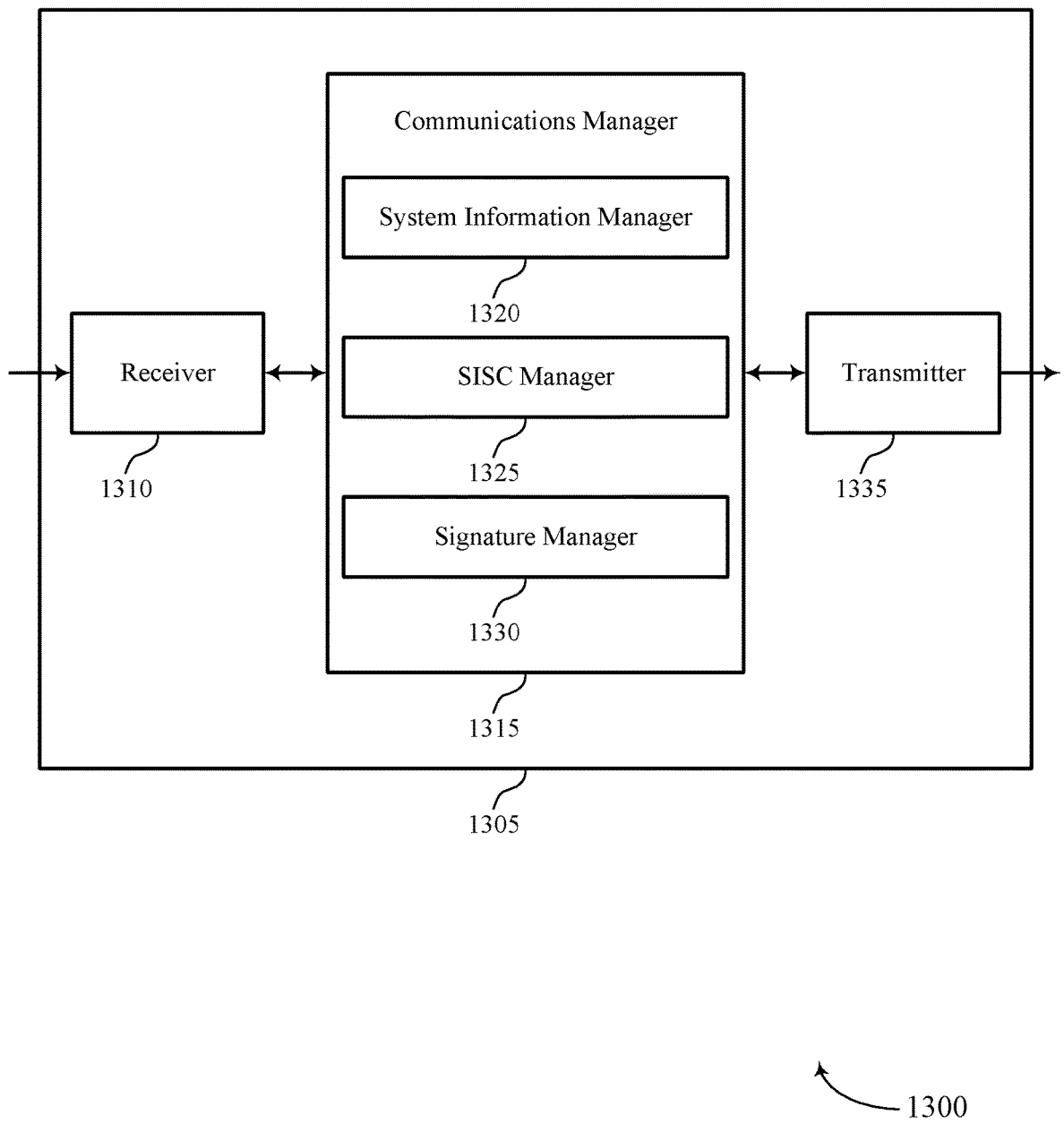

FIG. 13 shows a block diagram 1300 of a device 1305 that supports a SISC in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to a SISC, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a system information manager 1320, a SISC manager 1325, and a signature manager 1330. The communications manager 1315 may be an example of aspects of the communications manager 1510 described herein.

The system information manager 1320 may identify one or more SIBs to broadcast to one or more UEs. The SISC manager 1325 may generate a SISC including integrity information of the one or more SIBs. The signature manager 1330 may perform a signing procedure to include a signature with the SISC. The SISC manager 1325 may broadcast the SISC including the integrity information of the one or more SIBs with the signature to the one or more UEs.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
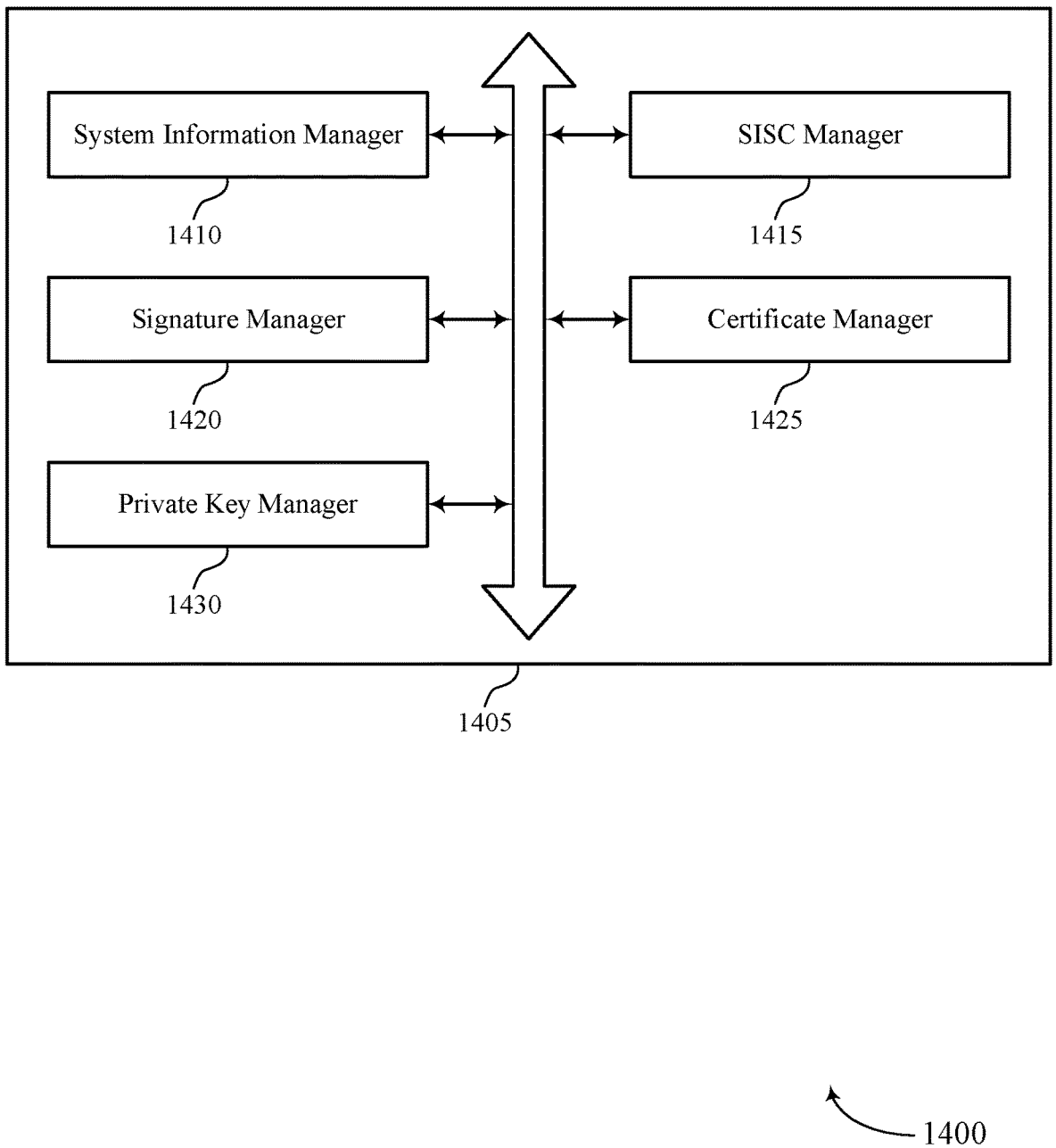
FIG. 14 shows a block diagram of a communications manager that supports a SISC in accordance with aspects of the present disclosure.

FIG. 14 shows a block diagram 1400 of a communications manager 1405 that supports a SISC in accordance with aspects of the present disclosure. The communications manager 1405 may be an example of aspects of a communications manager 1215, a communications manager 1315, or a communications manager 1510 described herein. The communications manager 1405 may include a system information manager 1410, a SISC manager 1415, a signature manager 1420, a certificate manager 1425, and a private key manager 1430. Each of these modules may communicate, directly or indirectly, with one another (e.g., via one or more buses).

The system information manager 1410 may identify one or more SIBs to broadcast to one or more UEs. The SISC manager 1415 may generate a SISC including integrity information of the one or more SIBs. The signature manager 1420 may perform a signing procedure to include a signature with the SISC. In some examples, the SISC manager 1415 may broadcast the SISC including the integrity information of the one or more SIBs with the signature to the one or more UEs.

In some examples the SISC includes an indication of indices of the one or more SIBs. In some examples, the SISC manager 1415 may broadcast the SISC in a SIB1 transmission, the SISC including the SIB1. In some examples, the SISC manager 1415 may broadcast the SISC in a security SIB transmission. The certificate manager 1425 may receive an indication of a certificate to use to sign the SISC, the certificate being associated with the cell identity of the base station, and the signature manager 1420 may generate the signature to include with the SISC based on the certificate. In some examples, the signature manager 1420 may determine a randomness parameter, where generating the signature to include with the SISC is further based on the randomness parameter. In some examples, the signature manager 1420 may determine the randomness parameter based on an SFN, an HSFN, a UTC, or a combination thereof.

The private key manager 1430 may receive an indication of a private key to use to sign the system information security container, the private key being associated with the cell identity of the base station. In some examples, the signature manager 1420 may generate the signature to include with the system information security container based on the private key. In some examples, the signature manager 1420 may determine a randomness parameter, where generating the signature to include with the system information security container is further based on the randomness parameter and the cell identity. In some examples, the signature manager 1420 may transmit the SISC to a network entity as a request for the signature. In some examples, the signature manager 1420 may receive the SISC with the signature from the network entity, where the SISC is signed by the network entity using a private key associated with the cell identity of the base station. In some cases, the integrity information of the one or more SIBs includes one or more hashed SIBs. In some cases, the one or more SIBs include security sensitive SIBs.

Figure 15:
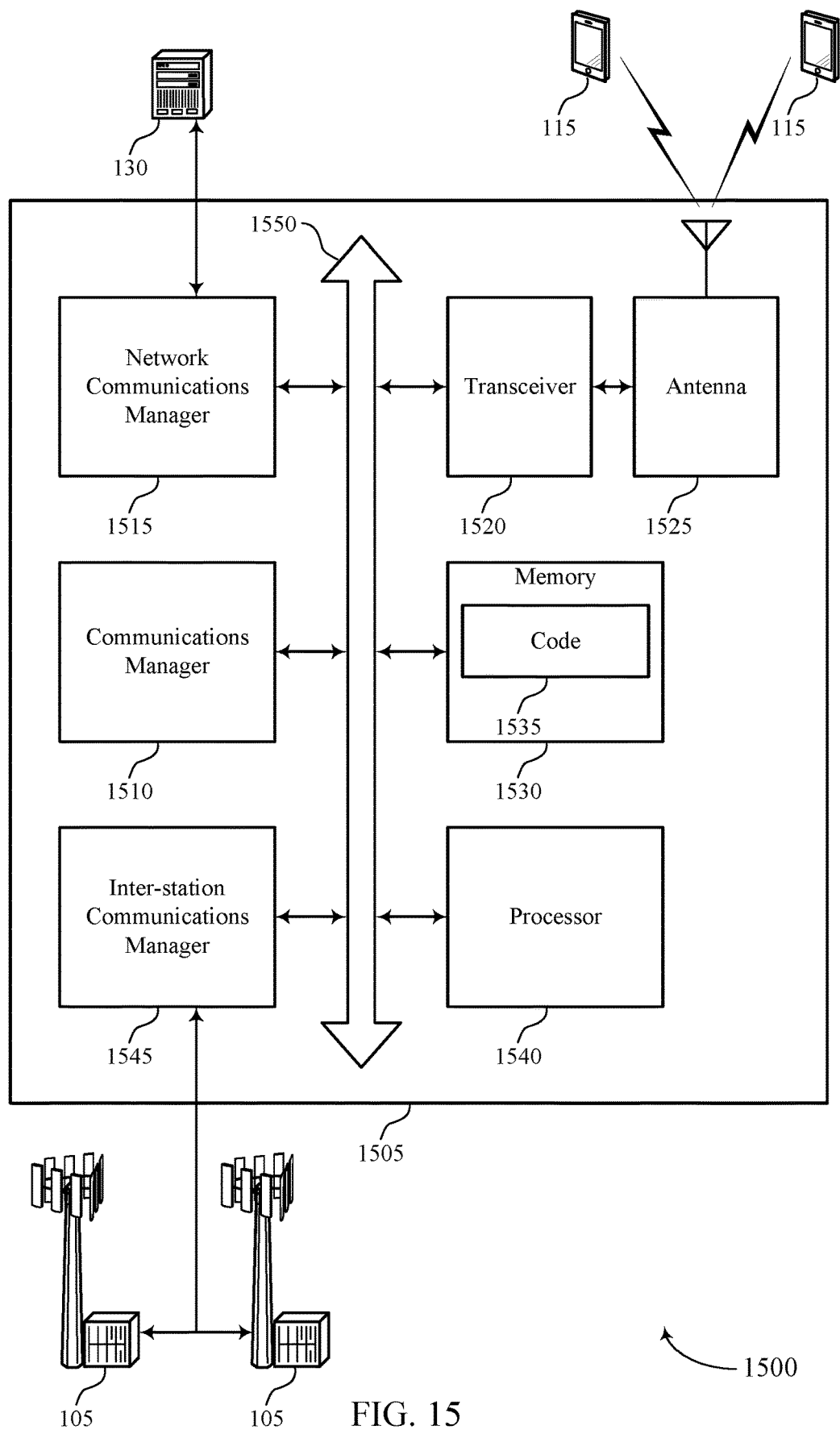
FIG. 15 shows a diagram of a system including a device that supports a SISC in accordance with aspects of the present disclosure.

FIG. 15 shows a diagram of a system 1500 including a device 1505 that supports a SISC in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify one or more SIBs to broadcast to one or more UEs, generate a SISC including integrity information of the one or more SIBs, perform a signing procedure to include a signature with the SISC, the signature indicating that the SISC is associated with a cell identity of the base station, and broadcast the SISC including the integrity information of the one or more SIBs with the signature to the one or more UEs.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting a SISC).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
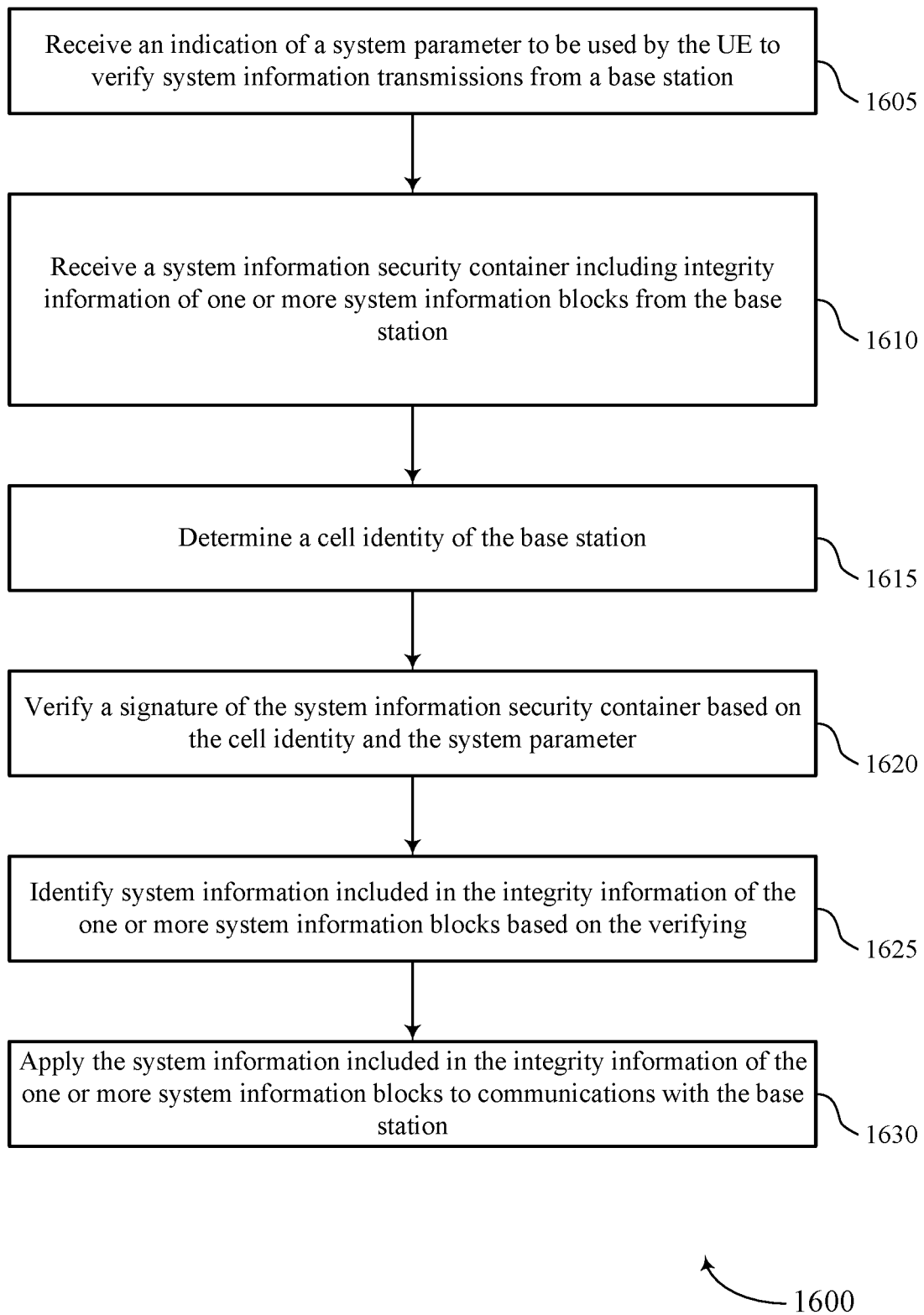
FIGS. 16 and 17 show flowcharts illustrating methods that support a SISC in accordance with aspects of the present disclosure.

FIG. 16 shows a flowchart illustrating a method 1600 that supports a SISC in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive an indication of a system parameter to be used by the UE to verify system information transmissions from a base station. The operations of 1605 may be performed according to the methods described herein. In some examples, aspects of the operations of 1605 may be performed by a signature verification manager as described with reference to FIGS. 8 through 11.

At 1610, the UE may receive a SISC including integrity information of one or more SIBs from the base station. The operations of 1610 may be performed according to the methods described herein. In some examples, aspects of the operations of 1610 may be performed by a SISC manager as described with reference to FIGS. 8 through 11.

At 1615, the UE may determine a cell identity of the base station. The operations of 1615 may be performed according to the methods described herein. In some examples, aspects of the operations of 1615 may be performed by a signature verification manager as described with reference to FIGS. 8 through 11.

At 1620, the UE may verify a signature of the SISC based on the cell identity and the system parameter. The operations of 1620 may be performed according to the methods described herein. In some examples, aspects of the operations of 1620 may be performed by a signature verification manager as described with reference to FIGS. 8 through 11.

At 1625, the UE may identify system information included in the integrity information of the one or more SIBs based on the verifying. The operations of 1625 may be performed according to the methods described herein. In some examples, aspects of the operations of 1625 may be performed by a system information manager as described with reference to FIGS. 8 through 11.

At 1630, the UE may apply the system information included in the integrity information of the one or more SIBs to communications with the base station. The operations of 1630 may be performed according to the methods described herein. In some examples, aspects of the operations of 1630 may be performed by a system information manager as described with reference to FIGS. 8 through 11.

Figure 17:
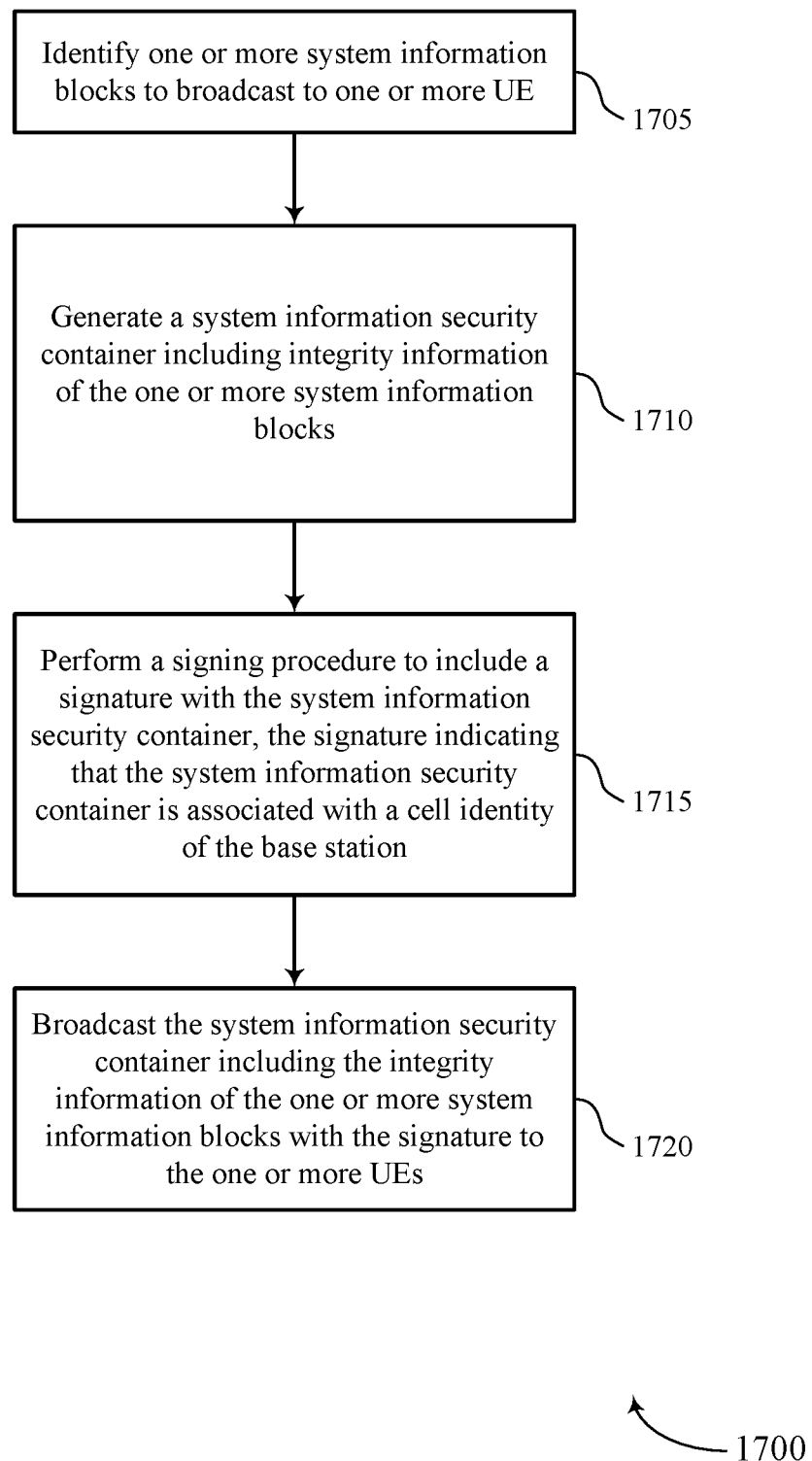

FIG. 17 shows a flowchart illustrating a method 1700 that supports a SISC in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may identify one or more SIBs to broadcast to one or more UEs. The operations of 1705 may be performed according to the methods described herein. In some examples, aspects of the operations of 1705 may be performed by a system information manager as described with reference to FIGS. 12 through 15.

At 1710, the base station may generate a SISC including integrity information of the one or more SIBs. The operations of 1710 may be performed according to the methods described herein. In some examples, aspects of the operations of 1710 may be performed by a SISC manager as described with reference to FIGS. 12 through 15.

At 1715, the base station may perform a signing procedure to include a signature with the SISC, the signature indicating that the SISC is associated with a cell identity of the base station. The operations of 1715 may be performed according to the methods described herein. In some examples, aspects of the operations of 1715 may be performed by a signature manager as described with reference to FIGS. 12 through 15.

At 1720, the base station may broadcast the SISC including the integrity information of the one or more SIBs with the signature to the one or more UEs. The operations of 1720 may be performed according to the methods described herein. In some examples, aspects of the operations of 1720 may be performed by a SISC manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an indication of a system parameter to be used by the UE to verify system information transmissions from a base station;
   receiving a system information security container including integrity information of one or more system information blocks from the base station, the system information security container being signed by the base station using a certificate;
   determining a cell identity of the base station;
   verifying the certificate based at least in part on the system parameter and the cell identity, wherein the system parameter comprises a public key;
   verifying a signature of the system information security container based at least in part on the cell identity, the certificate, and the system parameter;
   identifying system information included in the integrity information of the one or more system information blocks based at least in part on the verifying; and
   applying the system information included in the integrity information of the one or more system information blocks to communications with the base station.

2. The method of claim 1, wherein the system information security container comprises a set of indices of the one or more system information blocks and corresponding integrity information, wherein the integrity information is a hash of the one or more system information blocks.

3. The method of claim 2, wherein the signature is computed over the set and indicates that the system information security container is associated with the cell identity of the base station.

4. The method of claim 1, wherein receiving the system information security container comprises:
   receiving the system information security container in a system information block 1 (SIB1) transmission, the system information security container including the SIB1.

5. The method of claim 1, wherein receiving the system information security container comprises:
   receiving the system information security container in a security system information block transmission.

6. The method of claim 1, further comprising:
   determining a randomness parameter used to generate the signature of the system information security container, wherein verifying the signature of the system information security container is further based at least in part on the randomness parameter.

7. The method of claim 6, wherein determining the randomness parameter comprises:
   determining the randomness parameter based at least in part on a system frame number, a hyper system frame number, a coordinated universal time, or a combination thereof.

8. The method of claim 1, wherein determining the cell identity comprises:
   determining the cell identity of the base station based at least in part on the system information included in the integrity information of the one or more system information blocks.

9. The method of claim 1, wherein receiving the indication of the system parameter comprises:
   receiving the indication of the system parameter in a registration procedure.

10. The method of claim 1, wherein the integrity information of the one or more system information blocks comprises one or more hashed system information blocks.

11. The method of claim 10, wherein identifying the system information included in the integrity information of the one or more system information blocks comprises:
    decoding the one or more hashed system information blocks to identify the system information.

12. The method of claim 1, wherein the one or more system information blocks comprise security sensitive system information blocks.

13. The apparatus of claim 1, wherein the system information security container comprises a set of indices of the one or more system information blocks and corresponding integrity information, wherein the integrity information is a hash of the one or more system information blocks.

14. The apparatus of claim 13, wherein the signature is computed over the set and indicates that the system information security container is associated with the cell identity of the base station.

15. An apparatus for wireless communication at a user equipment (UE), comprising:
a processor,
memory in electronic communication with the processor; and
instructions stored in the memory and executable by the processor to cause the apparatus to:
receive an indication of a system parameter to be used by the UE to verify system information transmissions from a base station;
receive a system information security container including integrity information of one or more system information blocks from the base station, the system information security container being signed by the base station using a certificate;
determine a cell identity of the base station;
verify the certificate based at least in part on the system parameter and the cell identity, wherein the system parameter comprises a public key;
verify a signature of the system information security container based at least in part on the cell identity, the certificate, and the system parameter;
identify system information included in the integrity information of the one or more system information blocks based at least in part on the verifying; and
apply the system information included in the integrity information of the one or more system information blocks to communications with the base station.

16. The apparatus of claim 15, wherein the instructions stored in the memory and executable by the processor further cause the apparatus to:
receive the system information security container in a system information block 1 (SIB1) transmission, the system information security container including the SIB1.

17. The apparatus of claim 15, wherein the instructions stored in the memory and executable by the processor further cause the apparatus to:
receive the system information security container in a security system information block transmission.

18. The apparatus of claim 15, wherein the instructions stored in the memory and executable by the processor further cause the apparatus to:
determine a randomness parameter used to generate the signature of the system information security container, and to verify the signature of the system information security container based further at least in part on the randomness parameter.

19. The apparatus of claim 18, wherein the instructions stored in the memory and executable by the processor further cause the apparatus to:
determine the randomness parameter based further at least in part on a system frame number, a hyper system frame number, a coordinated universal time, or a combination thereof.

20. The apparatus of claim 15, wherein the instructions stored in the memory and executable by the processor further cause the apparatus to:
determine the cell identity of the base station based at least in part on the system information included in the integrity information of the one or more system information blocks.

21. The apparatus of claim 15, the system parameter is received as part of a registration procedure.

22. The apparatus of claim 21, wherein the instructions stored in the memory and executable by the processor further cause the apparatus to:
decode the one or more hashed system information blocks to identify the system information.

23. The apparatus of claim 15, wherein the integrity information of the one or more system information blocks comprises one or more hashed system information blocks.

24. The apparatus of claim 15, wherein the one or more system information blocks comprise security sensitive system information blocks.

* * * * *